United States Patent
Eom

(10) Patent No.: US 9,167,146 B2
(45) Date of Patent: Oct. 20, 2015

(54) METHOD OF RECEIVING CONNECTION INFORMATION FROM MOBILE COMMUNICATION DEVICE, COMPUTER-READABLE STORAGE MEDIUM HAVING RECORDED THEREON THE METHOD, AND DIGITAL IMAGE-CAPTURING APPARATUS

(71) Applicant: SAMSUNG ELECTRONICS CO., LTD., Suwon-si, Gyeonggi-do (KR)

(72) Inventor: Tae-won Eom, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/108,696

(22) Filed: Dec. 17, 2013

(65) Prior Publication Data

US 2014/0184830 A1 Jul. 3, 2014

(30) Foreign Application Priority Data

Dec. 31, 2012 (KR) .................. 10-2012-0158527

(51) Int. Cl.
| | |
|---|---|
| H04N 5/232 | (2006.01) |
| H04B 5/00 | (2006.01) |
| H04N 1/00 | (2006.01) |
| H04W 12/04 | (2009.01) |
| H04M 1/725 | (2006.01) |

(52) U.S. Cl.
CPC ............ *H04N 5/23206* (2013.01); *H04B 5/00* (2013.01); *H04M 1/7253* (2013.01); *H04N 1/00204* (2013.01); *H04W 12/04* (2013.01); *H04M 2250/04* (2013.01)

(58) Field of Classification Search
None
See application file for complete search history.

(56) References Cited

U.S. PATENT DOCUMENTS

| | | | |
|---|---|---|---|
| 8,738,687 B2 * | 5/2014 | Nakajima | ..................... 709/203 |
| 2003/0122940 A1 * | 7/2003 | Myojo | ........................ 348/231.2 |
| 2011/0040862 A1 * | 2/2011 | Nakajima | ..................... 709/223 |
| 2011/0069179 A1 | 3/2011 | Bathiche et al. | |

(Continued)

FOREIGN PATENT DOCUMENTS

| | | |
|---|---|---|
| JP | 2009-060163 A | 3/2009 |
| KR | 10-2010-0093421 A | 8/2010 |

(Continued)

OTHER PUBLICATIONS

Search Report and Written Opinion issued for PCT/KR2013/012152 (Apr. 18, 2014).

(Continued)

*Primary Examiner* — Jason Flohre
(74) *Attorney, Agent, or Firm* — Drinker Biddle & Reath LLP

(57) ABSTRACT

A method of receiving, by a digital image-capturing apparatus, connection information from a mobile communication terminal is described. Connection information is received from a mobile communication terminal that is connected with the digital image-capturing apparatus via near field communication (NFC). The connection information is input to an input window for performing a communication connection with an external device. A communication connection is performed with the external device, based on the connection information. The external device comprises at least one of an access point (AP) or a server. The connection information is used in communication with the external device.

20 Claims, 12 Drawing Sheets

(56) References Cited

U.S. PATENT DOCUMENTS

| | | |
|---|---|---|
| 2012/0099566 A1 | 4/2012 | Laine et al. |
| 2012/0208462 A1* | 8/2012 | Lee et al. .................... 455/41.2 |
| 2013/0208109 A1 | 8/2013 | Landry |
| 2013/0309971 A1* | 11/2013 | Kiukkonen et al. ......... 455/41.2 |

FOREIGN PATENT DOCUMENTS

| | | |
|---|---|---|
| KR | 10-2010-0098049 A | 9/2010 |
| KR | 10-2012-0013864 A | 2/2012 |
| KR | 10-2012-0040765 A | 4/2012 |
| WO | WO 2004/025901 A2 | 3/2004 |
| WO | WO 2006/106393 A2 | 10/2006 |

OTHER PUBLICATIONS

Extended European Search Report issued for EP 13199868.4 (May 8, 2014).

\* cited by examiner

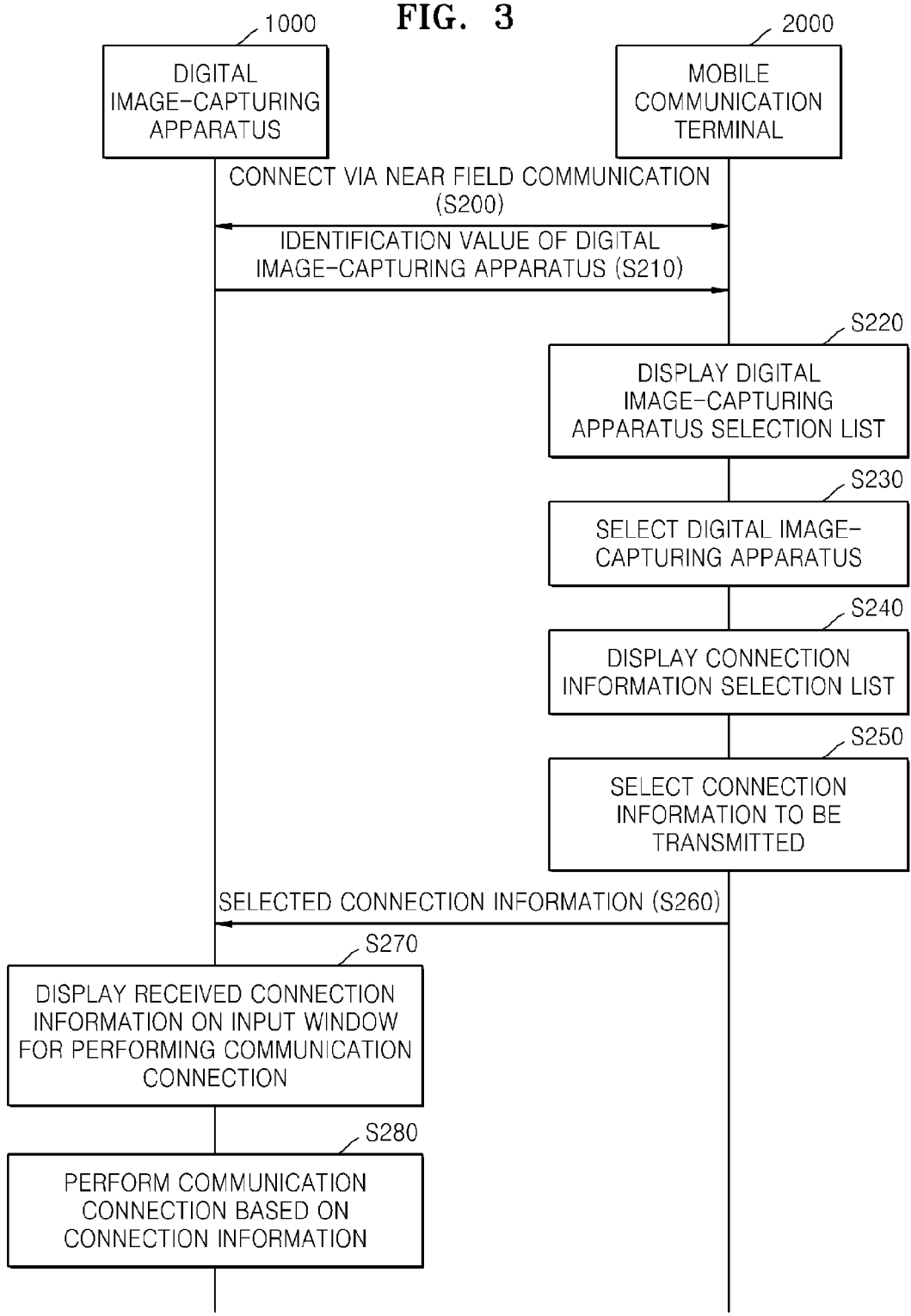

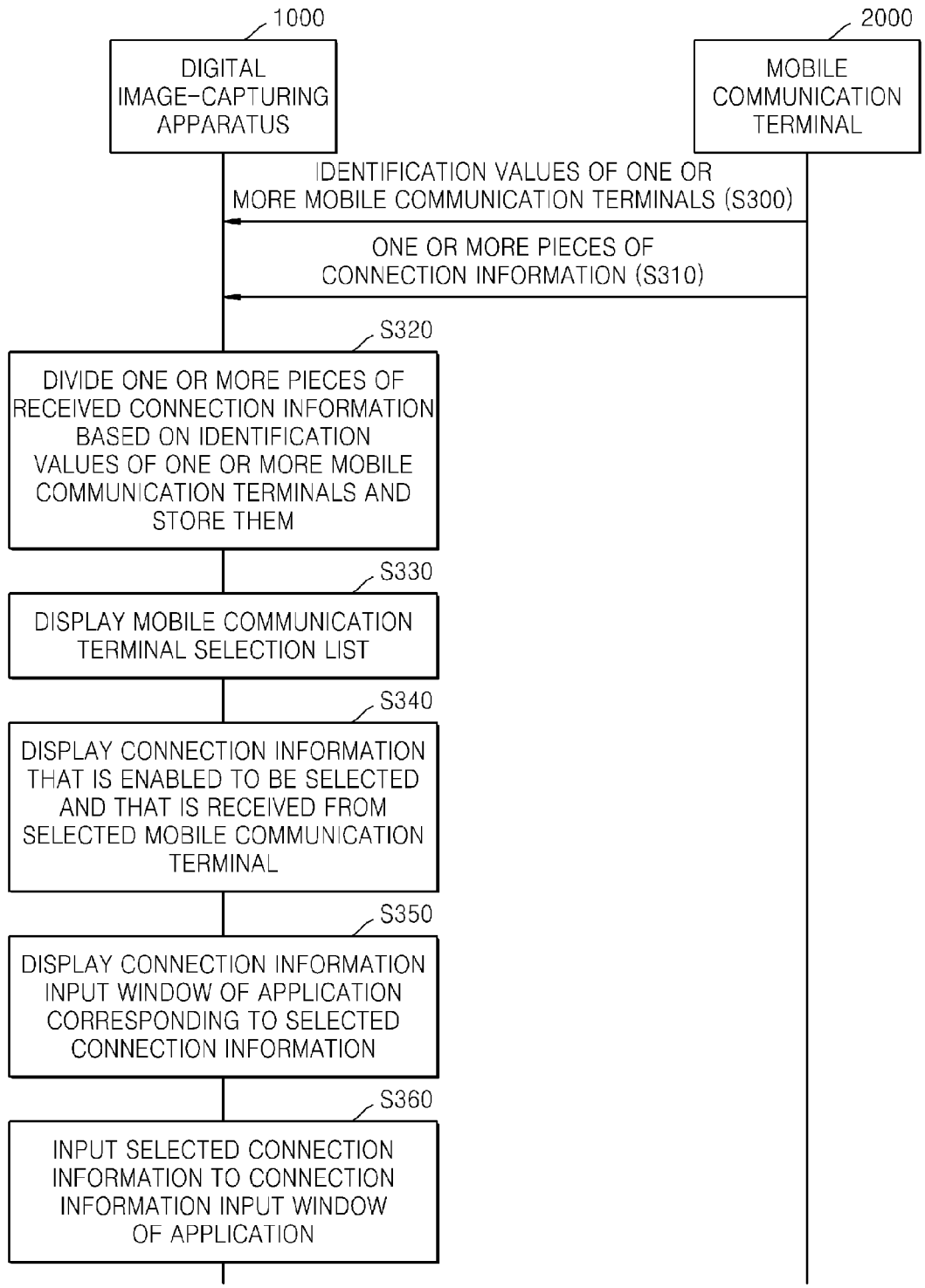

METHOD OF RECEIVING CONNECTION INFORMATION FROM MOBILE COMMUNICATION DEVICE, COMPUTER-READABLE STORAGE MEDIUM HAVING RECORDED THEREON THE METHOD, AND DIGITAL IMAGE-CAPTURING APPARATUS

CROSS-REFERENCE TO RELATED APPLICATIONS

This application claims the priority benefit under 35 U.S.C. §119(a) from Korean Patent Application No. 10-2012-0158527, filed on Dec. 31, 2012, in the Korean Intellectual Property Office, the disclosure of which is incorporated herein in its entirety by reference.

BACKGROUND OF THE INVENTION

1. Field

Various embodiments of the invention relate to a method of receiving, by a digital image-capturing apparatus, connection information from a mobile communication terminal, a computer-readable storage medium having recorded thereon the method, and the digital image-capturing apparatus that performs the method.

2. Related Art

A digital image-capturing apparatus has a wireless communication function or performs wireless internet by using a modem. When the digital image-capturing apparatus accesses wireless internet, the digital image-capturing apparatus may easily access it, but, in a case of a private access point (AP), the digital image-capturing apparatus may have to undergo complicated setting operations such as authentication, data encryption, and the like.

Also, a social network service (SNS) allows users to form or be part of an online network, and in this regard, in order to access an SNS server, it is often necessary for a user to have an identification (ID) and/or an e-mail account and a password with respect to the SNS.

The digital image-capturing apparatus may directly upload a stored or captured image to the SNS server without connection to a personal computer (PC), and may directly transmit the image to an e-mail account without connection to a PC. In this case, in order for the digital image-capturing apparatus to access the SNS server or to transmit predetermined content to the e-mail account, an e-mail account and/or an ID and a password are required. However, since the digital image-capturing apparatus does not have a highly-functional input interface, it is very complicated and inconvenient for a user to input setting details to an input window of the digital image-capturing apparatus, wherein the setting details are a combination of English letters, special characters, and/or numbers. That is, most users who have smart phones are inconvenienced by re-inputting complicated setting details to the digital image-capturing apparatus even though the setting details are already set in their smart phones.

SUMMARY

Various embodiments of the invention provide a method of receiving, by a digital image-capturing apparatus, connection information from a mobile communication device, a computer-readable storage medium having recorded thereon the method, and the digital image-capturing apparatus that performs the method, whereby a complicated key input procedure may be skipped in the digital image-capturing apparatus when the digital image-capturing apparatus performs communication with an external device.

Various embodiments of the invention may also provide a method of receiving, by a digital image-capturing apparatus, connection information from a mobile communication device, a computer-readable storage medium having recorded thereon the method, and the digital image-capturing apparatus that performs the method, whereby, when users of one or more mobile communication terminals attempt to use the digital image-capturing apparatus, the digital image-capturing apparatus may manage the connection information for each of the one or more mobile communication terminals.

According to an embodiment, a method of receiving, by a digital image-capturing apparatus, connection information from a mobile communication terminal includes: receiving connection information from a mobile communication terminal that is connected with the digital image-capturing apparatus via near field communication (NFC); inputting the connection information to an input window for performing a communication connection with an external device; and performing the communication connection with the external device, based on the connection information. The external device includes at least one of an access point (AP) or a server. The connection information is used in communication with the external device.

The method may further include: receiving identification (ID) values of one or more mobile communication terminals from the one or more mobile communication terminals; and dividing and storing one or more pieces of the connection information based on the ID values.

The method may further include: displaying a mobile communication terminal selection list, based on the ID values; and displaying connection information received from a selected mobile communication terminal that is selected from the mobile communication terminal selection list.

Inputting the connection information may include: displaying the connection information received from the selected mobile communication terminal, where the connection information is enabled to be selected; displaying a connection information input window of an application corresponding to selected connection information; and inputting the selected connection information to the connection information input window of the application.

The external device may include a server that includes at least one of a social network service (SNS) server or a cloud service server. The connection information may include at least one of an ID, an e-mail, or a password for connection with the server.

According to another embodiment, a method of providing connection information that may be performed by a mobile communication terminal includes: receiving identification (ID) values of one or more digital image-capturing apparatuses from the one or more digital image-capturing apparatuses, where the one or more digital image-capturing apparatuses are connected with the mobile communication terminal via near field communication (NFC); displaying a digital image-capturing apparatus selection list, based on the ID values; and providing connection information to a digital image-capturing apparatus selected from the digital image-capturing apparatus selection list. The connection information is used for the selected digital image-capturing apparatus to perform communication connection with an external device. The external device includes at least one of an access point (AP) or a server.

The method may further include: displaying a connection information selection list corresponding to the selected digital image-capturing apparatus; and providing connection information selected from the connection information selection list to the selected digital image-capturing apparatus.

The external device may include a server that includes at least one of a social network service (SNS) server or a cloud service server. The connection information may include at least one of an ID, an e-mail, or a password for connection with the server.

According to another embodiment, a digital image-capturing apparatus includes: a connection information receiving unit that receives connection information from a mobile communication terminal that is connected with the digital image-capturing apparatus via near field communication (NFC); a connection information input unit that inputs the connection information to an input window for performing communication connection with an external device; and a communication connection unit that performs the communication connection with the external device, based on the connection information. The external device includes at least one of an access point (AP) or a server. The connection information is used in communication with the external device.

The digital image-capturing apparatus may further include: a first identification (ID) value obtaining unit that receives identification (ID) values of one or more mobile communication terminals from the one or more mobile communication terminals; and a memory that stores one or more pieces of the connection information that are divided based on the ID values obtained by the first ID value obtaining unit.

The digital image-capturing apparatus may further include: a mobile communication terminal selection list generating unit that generates a mobile communication terminal selection list, based on the ID values obtained by the first ID value obtaining unit; a user input unit that allows selection of a mobile communication terminal from the mobile communication terminal selection list generated by the mobile communication terminal selection list generating unit; and a first display unit that displays connection information received from the selected mobile communication terminal.

The connection information input unit may display the connection information received from the selected mobile communication terminal. The connection information is enabled to be selected by a user. The connection information input unit may input selected connection information to a connection information input window of an application that corresponds to the selected connection information.

The external device may include a server that includes at least one of a social network service (SNS) server or a cloud service server, and the connection information may include at least one of an ID, an e-mail, and a password for connection with the server.

According to another embodiment, a non-transitory computer-readable recording medium has recorded thereon computer program codes for executing a method of receiving, by a digital image-capturing apparatus, connection information. The method includes: receiving connection information from a mobile communication terminal that is connected with the digital image-capturing apparatus via near field communication (NFC); inputting the connection information to an input window for performing a communication connection with an external device; and performing the communication connection with the external device, based on the connection information. The external device includes at least one of an access point (AP) or a server. The connection information is used in communication with the external device.

The method may further include: receiving identification (ID) values of one or more mobile communication terminals from the one or more mobile communication terminals; and dividing and storing one or more pieces of the connection information based on the ID values.

The method may further include: displaying a mobile communication terminal selection list, based on the ID values; and displaying connection information received from a selected mobile communication terminal that is selected from the mobile communication terminal selection list.

Inputting the connection information may include: displaying the connection information received from the selected mobile communication terminal, where the connection information is enabled to be selected; displaying a connection information input window of an application corresponding to selected connection information; and inputting the selected connection information to the connection information input window of the application.

The external device may include a server that includes at least one of a social network service (SNS) server or a cloud service server. The connection information may include at least one of an ID, an e-mail, or a password for connection with the server.

According to another embodiment, a mobile communication terminal includes: an identification (ID) value obtaining unit that receives identification (ID) values of one or more digital image-capturing apparatuses from the one or more digital image-capturing apparatuses, wherein the one or more digital image-capturing apparatuses are connected with the mobile communication terminal via near field communication (NFC); a display unit that displays a digital image-capturing apparatus selection list, based on the ID values; and a connection information providing unit that provides connection information to a selected digital image-capturing apparatus that is selected from the digital image-capturing apparatus selection list. The connection information is used for the selected digital image-capturing apparatus to perform communication connection with an external device. The external device comprises at least one of an access point (AP) or a server.

According to another embodiment, a non-transitory computer-readable recording medium has recorded thereon computer program codes for executing a method of providing, by a mobile communication terminal, connection information. The method includes: receiving identification (ID) values of one or more digital image-capturing apparatuses from the one or more digital image-capturing apparatuses, wherein the one or more digital image-capturing apparatuses are connected with the mobile communication terminal via near field communication (NFC); displaying a digital image-capturing apparatus selection list, based on the ID values; and providing connection information to a digital image-capturing apparatus selected from the digital image-capturing apparatus selection list. The connection information is used for the selected digital image-capturing apparatus to perform communication connection with an external device. The external device comprises at least one of an access point (AP) or a server.

BRIEF DESCRIPTION OF THE DRAWINGS

The above and other features and advantages of the invention will become apparent by describing in detail various embodiments thereof with reference to the attached drawings in which:

FIG. 3 is a flowchart for a method by which a mobile communication terminal of FIG. 1 provides connection information to the digital image-capturing apparatus of FIG. 1, and the digital image-capturing apparatus receives the connection information, according to an embodiment;

FIG. 4 is a flowchart for a method of managing, by the digital image-capturing apparatus of FIG. 1, a plurality of pieces of connection information received from one or more mobile communication terminals, for each of the one or more mobile communication terminals, according to an embodiment;

DETAILED DESCRIPTION OF THE INVENTION

Figure 1:
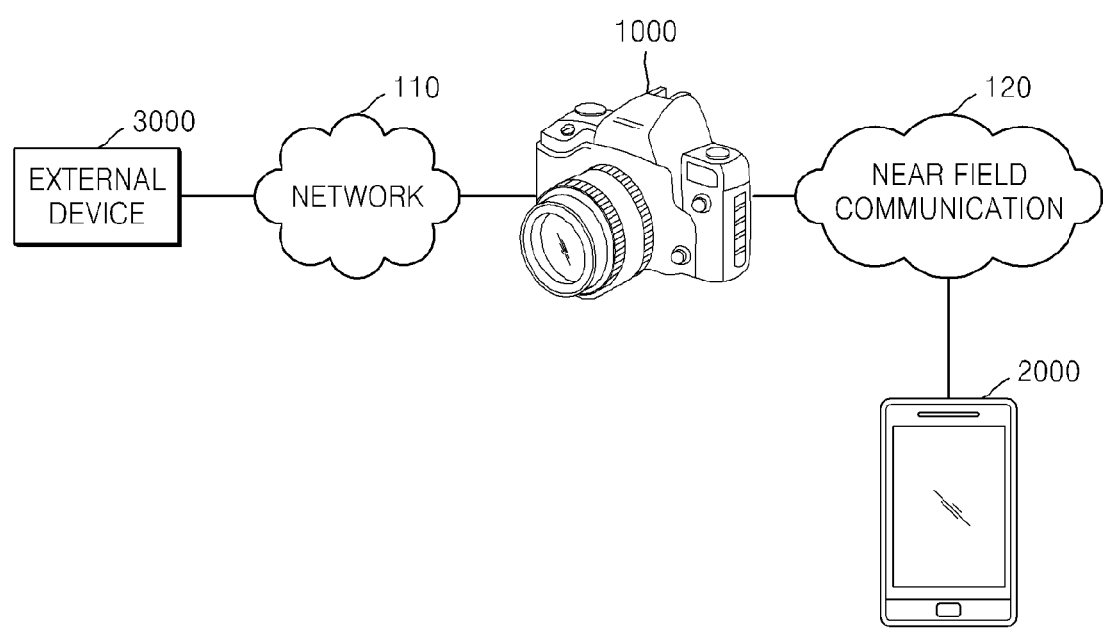
FIG. 1 illustrates a block diagram of a system that provides connection information by using a mobile communication terminal, according to an embodiment.

Various embodiments will now be described more fully with reference to the accompanying drawings, in which embodiments of the invention are shown. The invention may, however, be embodied in many different forms, and should not be construed as being limited to the embodiments set forth herein. Thus, the invention may include all revisions, equivalents, or substitutions which are included in the concept and the technical scope related to the invention.

While terms "first" and "second" are used to describe various components, it will be apparent that the components are not limited to the terms "first" and "second". The terms "first" and "second" are used only to distinguish between each component. For example, a first component may indicate a second component or a second component may indicate a first component without conflicting with the inventive concept.

Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify the existence of a recited form, a number, a process, an operation, a component, and/or groups thereof, not excluding the existence of one or more other recited forms, one or more other numbers, one or more other processes, one or more other operations, one or more other components and/or groups thereof.

Hereinafter, the embodiments of the invention will be described in detail by explaining embodiments of the invention with reference to the attached drawings. Like reference numerals in the drawings denote like elements and redundant explanations thereof will be omitted.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a block diagram of a system that provides connection information by using a mobile communication terminal, according to an embodiment.

As illustrated in FIG. 1, the system that provides connection information by using a mobile communication terminal includes a mobile communication terminal 2000, a digital image-capturing apparatus 1000, and an external device 3000. The digital image-capturing apparatus 1000 and the mobile communication terminal 2000 in one example communication using near field communication (NFC) 120. The digital image-capturing apparatus 1000 in one example communicates with the external device 3000 via a network 110.

The mobile communication terminal 2000 may have an application installed therein so as to provide connection information to the digital image-capturing apparatus 1000, based on connection information from the digital image-capturing apparatus 1000. The mobile communication terminal 2000 may provide the connection information to the digital image-capturing apparatus 1000 via the NFC 120 by using the installed application, wherein the connection information is used when the digital image-capturing apparatus 1000 performs communication connection with the external device 3000. That is, the installed application connects the digital image-capturing apparatus 1000 and the mobile communication terminal 2000 via the NFC 120. For example, when the application is executed, the mobile communication terminal 2000 may automatically search for and may be connected with the digital image-capturing apparatus 1000 by using, for example, Wi-Fi Direct or other types of NFC 120. Via this NFC 120, the mobile communication terminal 2000 may transmit connection information stored in the mobile communication terminal 2000 or data including an identification (ID) value of the mobile communication terminal 2000 to the digital image-capturing apparatus 1000. The connection information may include at least one of an executable file of the application or link information to download the application, wherein the application transmits the connection information or the data such as an ID value to the digital image-capturing apparatus 1000 via the NFC 120. However, an installation method in the mobile communication terminal 2000 is not limited to the aforementioned features. For example, the application may be directly downloaded to the mobile communication terminal 2000 via a web market or "app store."

The mobile communication terminal 2000 may provide the connection information to the digital image-capturing apparatus 1000 via the NFC 120. The connection information may be stored in the mobile communication terminal 2000 or may be input via the mobile communication terminal 2000. The connection information may be used for the digital image-capturing apparatus 1000 to perform communication connection with the external device 3000, and the external device 3000 may include at least one of an access point (AP) or a server. Also, the connection information may be used for the mobile communication terminal 2000 to perform communication connection with the external device 3000.

The ID value of the mobile communication terminal 200 may be provided to the digital image-capturing apparatus 1000 via the NFC 120. The ID value of the mobile communication terminal 2000 may be used when a mobile communication terminal selection list is generated in the digital image-capturing apparatus 1000. Also, when a plurality of pieces of connection information are received from a plurality of the mobile communication terminals 2000, respectively, the plurality of pieces of connection information may be divided by using ID values of the plurality of mobile communication terminals 2000 and then may be stored. By doing so, when the digital image-capturing apparatus 1000 receives the plurality of pieces of connection information from the plurality of mobile communication terminals 2000, respectively, the digital image-capturing apparatus 1000 may divide and manage the plurality of pieces of connection information according to the plurality of mobile communication terminals 2000.

Also, the mobile communication terminal 2000 may receive an ID value of the digital image-capturing apparatus 1000 via the NFC 120. The received ID value of the digital image-capturing apparatus 1000 may be used for the mobile communication terminal 2000 to generate a digital image-capturing apparatus selection list. The mobile communication terminal 2000 may provide at least one of connection information and the ID value of the mobile communication terminal 2000 to the digital image-capturing apparatus 1000 that is selected in response to a user input via the digital image-capturing apparatus selection list.

Also, the mobile communication terminal 2000 may be embodied as one of terminals enabled for the NFC 120 and network connection.

The mobile communication terminal 2000 may be embodied in one of various forms. In the present embodiment, the mobile communication terminal 2000 may include a desktop computer, a mobile phone, a smart phone, a laptop computer, a personal digital assistant (PDA), a portable multimedia player (PMP), a navigation device, a tablet personal computer (PC), an MP3 player, a digital camera, digital consumer electronics, or the like. The digital consumer electronics may include a digital television (digital TV), an internet protocol television (IP TV), a refrigerator having a display device, an air-conditioner having a display device, or the like.

The digital image-capturing apparatus 1000 may receive the ID value of the mobile communication terminal 2000 from the mobile communication terminal 2000 via the NFC 120. The ID value of the mobile communication terminal 2000 may be used when the digital image-capturing apparatus 1000 divides and stores the plurality of pieces of connection information from the plurality of mobile communication terminals 2000.

Also, the digital image-capturing apparatus 1000 may provide the ID value of the digital image-capturing apparatus 1000 to the mobile communication terminal 2000 via the NFC 120. The ID value of the digital image-capturing apparatus 1000 may be used when the mobile communication terminal 2000 generates the digital image-capturing apparatus selection list.

The NFC 120 may be implemented as an access communication network that allows bi-directional communication between the mobile communication terminal 2000 and the digital image-capturing apparatus 1000. The NFC 120 may include at least one of Bluetooth or Wi-Fi Direct communication.

The external device 3000 may be connected to the digital image-capturing apparatus 1000 via a network.

When the external device 3000 is the AP, the digital image-capturing apparatus 1000 or the mobile communication terminal 2000 may access internet via a wireless local area network (wireless LAN). A wireless access point (WAP) indicates a device that allows wireless devices to be connected to a wired device, by using the Wi-Fi or Bluetooth standard in a computer network. Within a predetermined range from where the AP is installed, a user may use high speed internet by using the mobile communication terminal 2000 or the digital image-capturing apparatus 1000. Since the high speed internet uses a wireless frequency, a phone line or a dedicated line is not required but the mobile communication terminal 2000 or the digital image-capturing apparatus 1000 may include a wireless network interface card (wireless NIC). Also, when the external device 3000 is the server, the mobile communication terminal 2000 or the digital image-capturing apparatus 1000 may access the server via the network 110.

The network 110 may be formed as a wired network such as a LAN, a wide area network (WAN), a value added network (VAN), or the like, or a wireless network such as a mobile radio communication network, a NFC network, a satellite communication network, or the like. Also, the network may collectively mean a data communication network that allows smooth communication among network parties shown in FIG. 1, and may include wired internet, wireless internet, a mobile radio communication network, or the like.

As an example of the network 110, internet access via a wireless LAN is generally used. The wireless LAN in one example includes 'Wi-Fi', wherein an Internet network terminal forms a wireless AP, and a wireless LAN receiver is installed at a communication terminal device such as a computer and performs communication access to the wireless AP for the wireless LAN via a weak radio wave (i.e., a radio wave having a small amount of power). In general, the wireless AP may be installed at a personal unit (or house). A plurality of receivers may simultaneously perform wireless access to one wireless AP, but the wireless access is allowed only to a receiver that undergoes an access point setting (AP setting) operation by using a particular user authentication key (e.g., a Wi-Fi protected access (WPA) key) and a third party attempting non-authentic wireless access is not allowed. The AP setting operation is called a Wi-Fi setting, and a user authentication key used in the AP setting operation includes a user-designated ID (e.g., a service set ID (SSID)) and an encryption key by a user that divides groups of the wireless LAN.

Figure 2:
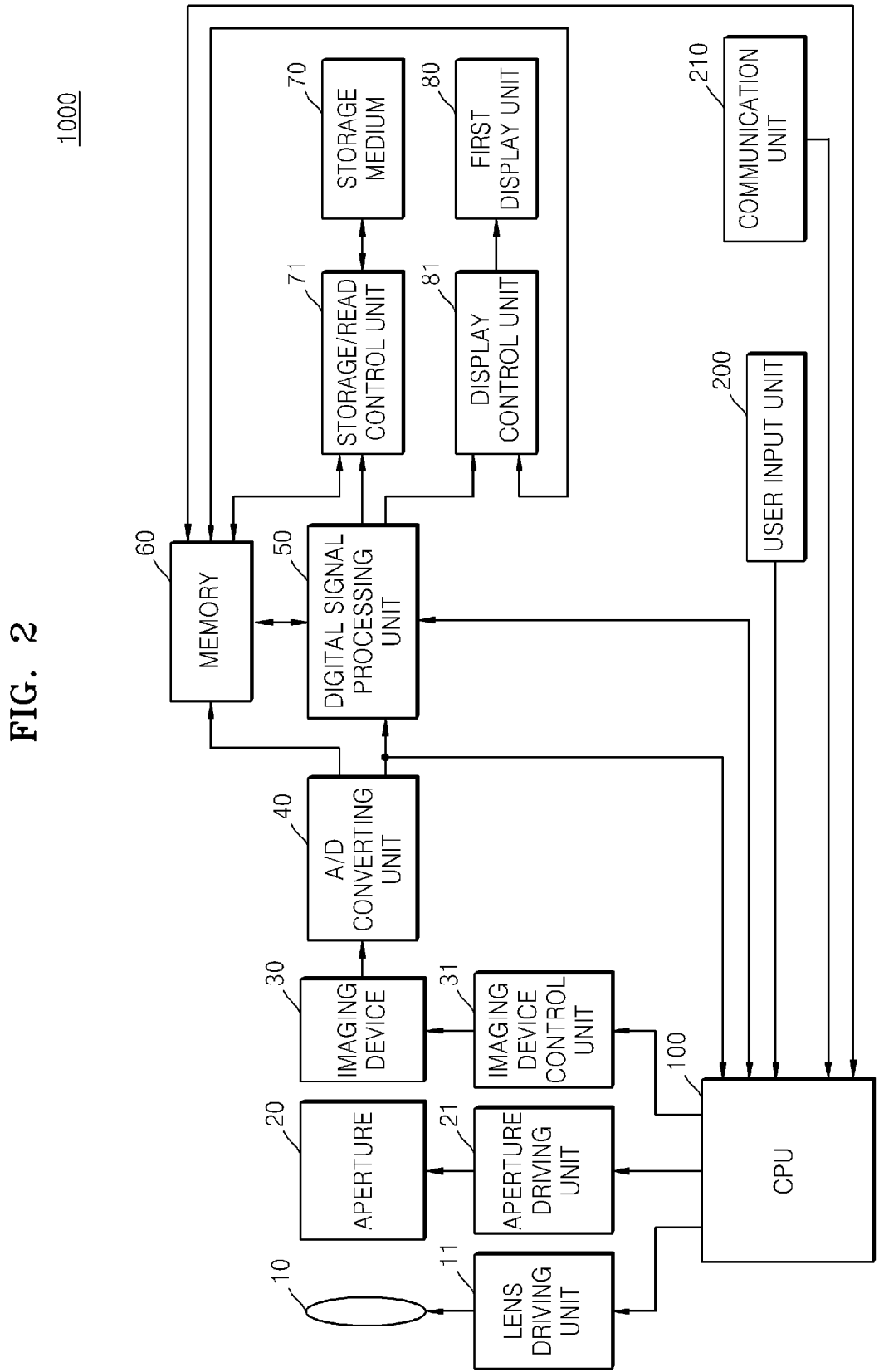
FIG. 2 is a block diagram of a digital image-capturing apparatus of FIG. 1 that receives connection information, according to an embodiment.

FIG. 2 is a block diagram of the digital image-capturing apparatus 1000 that receives connection information, according to an embodiment.

Operations of the digital image-capturing apparatus 1000 may be controlled by a central processing unit (CPU) 100. The digital image-capturing apparatus 1000 has a user input unit 200 that includes a key or the like which generates an electrical signal based on a user input. The electrical signal from the user input unit 200 is delivered to the CPU 100, thereby allowing the CPU 100 to control the digital image-capturing apparatus 1000 according to the user input.

In an image-capturing mode, when the user input from the user is applied to the CPU 100, the CPU 100 analyzes the user input and then controls a lens driving unit 11, an aperture driving unit 21, and an imaging device control unit 31, so that a position of a lens 10, a level of an opening of an aperture 20, and an ISO value of an imaging device 30 are controlled. The imaging device 30 generates data with respect to an image according to incident light, and an analog-to-digital (A/D) converting unit 40 converts analog data from the imaging device 30 to digital data. In other implementations, the A/D converting unit 40 may be omitted based on a characteristic of the imaging device 30.

The data from the imaging device 30 may be input to a digital signal processing unit 50 via a memory 60, may be input to the digital signal processing unit 50 without passing through the memory 60, or may be input to the CPU 100, if required. Here, the memory 60 includes a read-only memory (ROM) or a random-access memory (RAM). The digital signal processing unit 50 may perform digital signal processing including gamma compensation, white balance adjustment, or the like.

Image data output from the digital signal processing unit 50 may be delivered to a display control unit 81 via the memory 60 or is directly delivered to the display control unit 81. The display control unit 81 controls a first display unit 80, thereby displaying an image on the first display unit 80. The image data output from the digital signal processing unit 50 may also be delivered to a storage/read control unit 71 via the memory 60 or directly delivered to the storage/read control unit 71. The storage/read control unit 71 stores the image data to a storage medium 70 according to a signal from a user or automatically stores the image data to the storage medium 70. Alternatively, the storage/read control unit 71 may read data with respect to an image from an image file stored in the storage medium 70, may input the read data to the display control unit 81 via the memory 60 or another path, and thus may allow the image to be displayed on the first display unit 80. The storage medium 70 may be detachable or may be permanently mounted in the digital image-capturing apparatus 1000.

As described above, the digital image-capturing apparatus 1000 generates the image data from the light that is incident on the imaging device 30, and stores a digital image file having final image data to the storage medium 70.

FIG. 3 is a flowchart for a method by which the mobile communication terminal 2000 provides connection information to the digital image-capturing apparatus 1000, and the digital image-capturing apparatus 1000 receives the connection information, according to an embodiment.

In operation S200, the mobile communication terminal 2000 and the digital image-capturing apparatus 1000 are connected via NFC 120. The mobile communication terminal 2000 and the digital image-capturing apparatus 1000 may be connected when a second NFC unit 700 (FIG. 14) of the mobile communication terminal 2000 and a first NFC unit 640 (FIG. 13) of the digital image-capturing apparatus 1000 are simultaneously executed or activated. The first NFC unit 640 and the second NFC unit 700 may directly connect the mobile communication terminal 2000 and the digital image-capturing apparatus 1000 without using a WLAN AP, and an example of the direct connection may include at least one of a Wi-Fi Direct or Bluetooth connection.

Also, when an application installed in the mobile communication terminal 2000 is executed, the second NFC unit 700 in the mobile communication terminal 2000 may be executed or activated. In this case, the mobile communication terminal 2000 may be connected via the NFC 120 with the digital image-capturing apparatus 1000 in which the first NFC unit 640 is executed or activated. For this connection, the first NFC unit 640 and the second NFC unit 700 may implement a new firmware protocol in the digital image-capturing apparatus 1000 and the mobile communication terminal 2000.

The application may be used for the mobile communication terminal 2000 to provide the connection information to the digital image-capturing apparatus 1000 via the NFC 120. Also, the application may be used for the mobile communication terminal 2000 to receive an ID value of the digital image-capturing apparatus 1000 from the digital image-capturing apparatus 1000.

In operation S210, the mobile communication terminal 2000 receives an ID value of the digital image-capturing apparatus 1000 from the digital image-capturing apparatus 1000. The ID value of the digital image-capturing apparatus 1000 may include a type, a model name, or specification which are related to the digital image-capturing apparatus 1000, and may further include a type of an operation system (OS) installed in the digital image-capturing apparatus 1000. The mobile communication terminal 2000 may receive the ID value of the digital image-capturing apparatus 1000 from the digital image-capturing apparatus 1000 that is connected via the NFC 120.

The ID value of the digital image-capturing apparatus 1000 may be received from the digital image-capturing apparatus 1000 in response to a request of the mobile communication terminal 2000 according to execution of the application in the mobile communication terminal 2000. Also, when the digital image-capturing apparatus 1000 is connected to the mobile communication terminal 2000 via the NFC 120, the ID value of the digital image-capturing apparatus 1000 may be received from the digital image-capturing apparatus 1000.

In operation S220, the mobile communication terminal 2000 displays a digital image-capturing apparatus selection list.

The digital image-capturing apparatus selection list shows the digital image-capturing apparatus 1000 that is connected with the mobile communication terminal 2000 via the NFC 120. The mobile communication terminal 2000 may receive ID values of the digital image-capturing apparatuses 1000 from the digital image-capturing apparatuses 1000 via the NFC 120, and based on the ID values received from the digital image-capturing apparatuses 1000, the digital image-capturing apparatus selection list may be displayed on the mobile communication terminal 2000.

The digital image-capturing apparatus selection list on the mobile communication terminal 2000 is used in selection of the digital image-capturing apparatuses 1000 to receive connection information from the mobile communication terminal 2000.

Figure 5A:
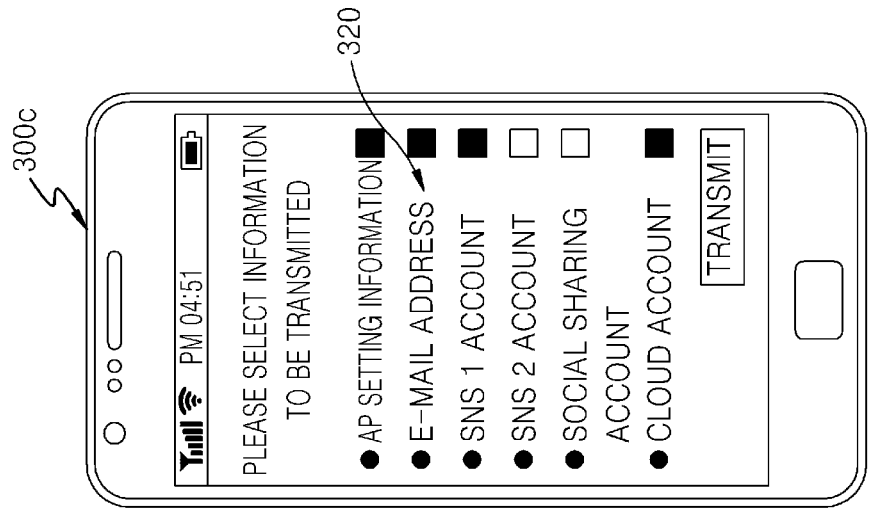
FIG. 5A illustrates an example display of the mobile communication terminal of FIG. 1 with a digital image-capturing apparatus selection list, according to an embodiment.

In order to distinguish between the digital image-capturing apparatuses 1000 in the digital image-capturing apparatus selection list, model names of the digital image-capturing apparatuses 1000 may be used as ID information displayed on the mobile communication terminal 2000. Also, a user may directly input and set the ID information displayed on the digital image-capturing apparatus selection list to the mobile communication terminal 2000. FIG. 5A illustrates an example display 300a of the mobile communication terminal 2000 displays the digital image-capturing apparatus selection list, according to an embodiment.

In operation S230, the mobile communication terminal 2000 selects the digital image-capturing apparatus 1000 based on a user input via the digital image-capturing apparatus selection list. The user input may include a simple operation involving touching a touch panel of the mobile communication terminal 2000, pressing a button of the mobile communication terminal 2000, or the like. One or more digital image-capturing apparatuses 1000 may be simultaneously selected from the digital image-capturing apparatus selection list. The mobile communication terminal 2000 may transmit the connection information to the digital image-capturing apparatus 1000 selected from the digital image-capturing apparatus selection list, via the NFC 120. The selected digital image-capturing apparatus 1000 may perform communication connection with the external device 3000 by using the connection information received from the mobile communication terminal 2000.

Figure 5B:
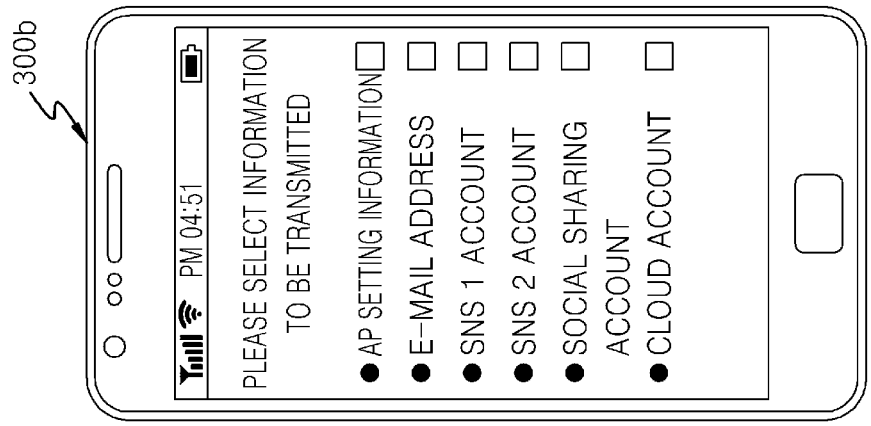
FIGS. 5B and 5C illustrate examples displays of the mobile communication terminal of FIG. 1 with a connection information selection list, according to embodiments.

In operation S240, the mobile communication terminal 2000 displays a connection information selection list. The connection information selection list shows a list of one or more pieces of connection information to be provided to the digital image-capturing apparatus 1000 that is selected in operation S230. The one or more pieces of connection information shown in the connection information selection list may be used for the selected digital image-capturing apparatus 1000 to perform communication connection with the external device 3000. In this case, the external device 3000 may include at least one of an AP or a server. For example, when the external device 3000 is the AP, the connection information may include AP setting information. The AP setting information may include authentication, data encryption, or the like. Also, when the external device 3000 is the server, the server may include at least one of a social network service (SNS) server or a cloud service server. In this case, the connection information may include at least one of an ID, an e-mail, or a password of the user so as to perform connection with the server. FIG. 5B illustrates an example display 300b of the mobile communication terminal 2000 in which the connection information selection list is displayed, according to an embodiment.

Figure 5C:
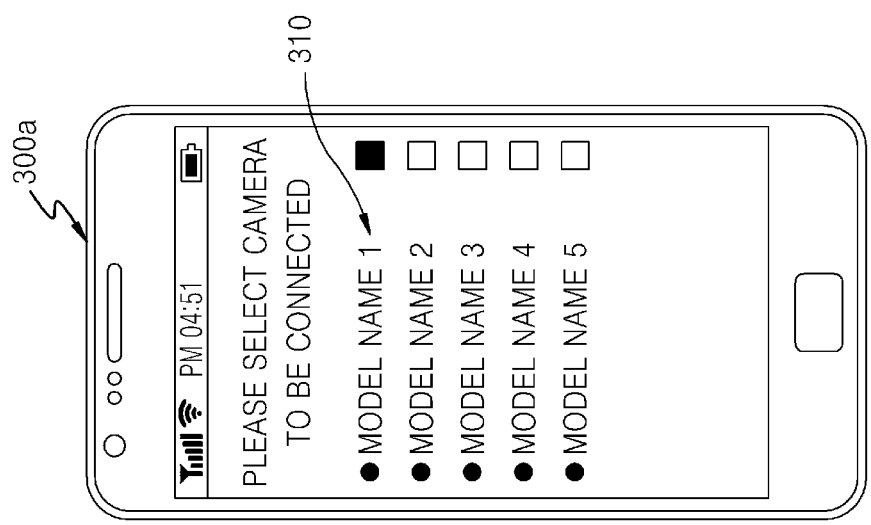

In operation S250, the mobile communication terminal 2000 selects connection information to be transmitted to the digital image-capturing apparatus 1000, based on a user input via the connection information selection list. The user input may include a simple operation involving touching a touch panel of the mobile communication terminal 2000, pressing a button of the mobile communication terminal 2000, or the like. The selected connection information may be transmitted to the digital image-capturing apparatus 1000 that is selected based on the user input via the digital image-capturing apparatus selection list. Also, the connection information may be stored in the memory 60 of the mobile communication terminal 2000 or may be input by a user input unit 200. FIG. 5C illustrates an example display 300c of the mobile communication terminal 2000 in which selected connection information 320 from the connection information selection list is displayed, in response to the user input, according to an embodiment.

In operation S260, the mobile communication terminal 2000 provides the connection information to the digital image-capturing apparatus 1000. The mobile communication terminal 2000 may provide the connection information selected from the connection information selection list to the digital image-capturing apparatus 1000 selected from the digital image-capturing apparatus selection list, via the NFC 120. The mobile communication terminal 2000 may provide one or more pieces of connection information to one or more digital image-capturing apparatuses 1000.

In operation S270, the digital image-capturing apparatus 1000 displays the connection information, which is received from the mobile communication terminal 2000, on an input window for performing communication connection with the external device 3000. The digital image-capturing apparatus 1000 is enabled for communication connection with the external device 3000, and for the communication connection with the external device 3000, the connection information may be directly input to the input window of the digital image-capturing apparatus 1000, and then the communication connection with the external device 3000 may be possible based on the input connection information.

The connection information is used for the digital image-capturing apparatus 1000 to perform the communication connection with the external device 3000, and for example, when the external device 3000 is the AP, the connection information may include at least one of Wi-Fi connection information, an SSID and password, a user ID, an e-mail, or an address response. Also, when the external device 3000 is the server, the connection information may include at least one of an ID, an e-mail, or a password of the user. However, the aforementioned connection information may be formed of a combination of numbers, letters, and special characters, and thus, it may be inconvenient to input the connection information by using a touch panel or by manipulating keys of the digital image-capturing apparatus 1000 that does not have a highly-functional input interface.

Figure 6A:
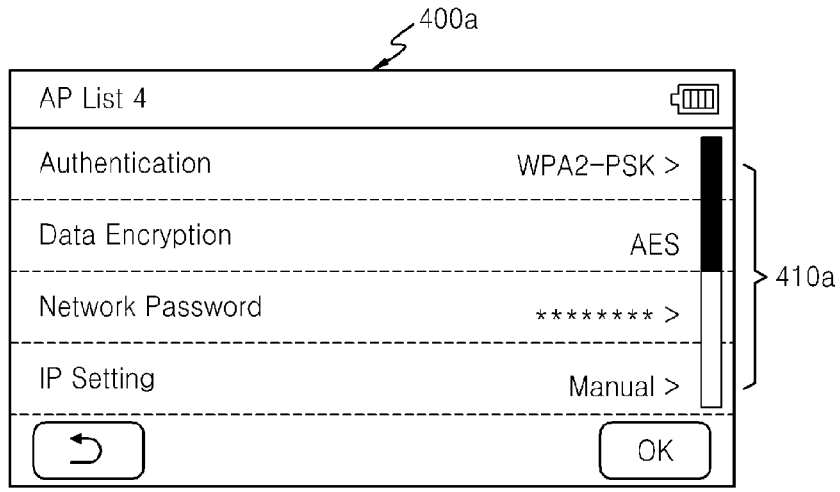
FIGS. 6A, 6B, and 6C illustrate example displays of the mobile communication terminal of FIG. 1 in which connection information is displayed in a connection information input window for performing communication connection between the digital image-capturing apparatus and an external device of FIG. 1, according to embodiments.
Figure 6B:
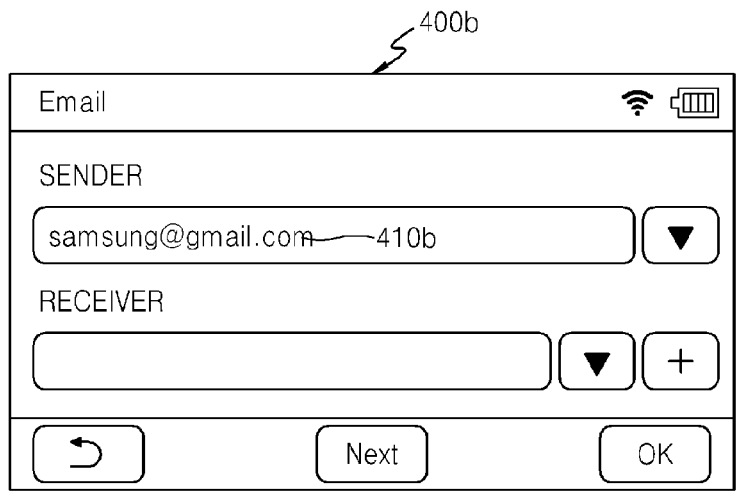
Figure 6C:
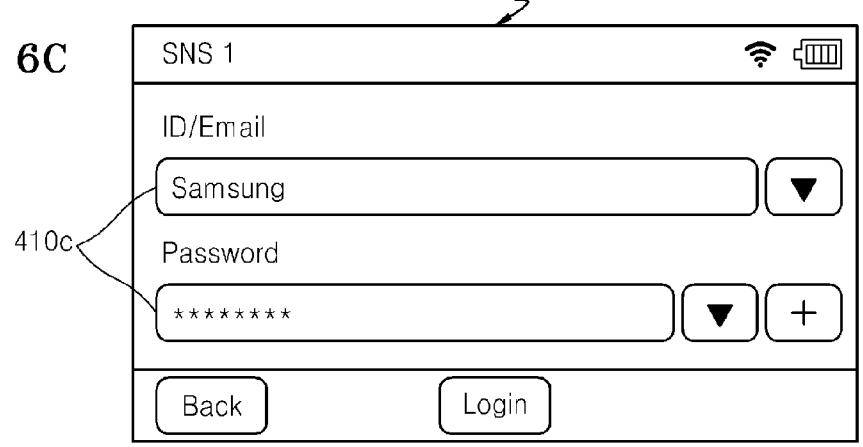

Thus, the digital image-capturing apparatus 1000 may control the connection information, which is received from the mobile communication terminal 2000 via the NFC 120, to be directly input to the input window for performing communication connection between the digital image-capturing apparatus 1000 and the external device 3000, so that the user is not required to directly input the connection information via an input interface of the digital image-capturing apparatus 1000. Each of a plurality of pieces of the input connection information may be displayed on each of fields of the input window for performing communication connection. Examples of the input window for performing communication connection between the digital image-capturing apparatus 1000 and the external device 3000 are shown in FIGS. 6A, 6B, and 6C.

In operation S280, the digital image-capturing apparatus 1000 performs communication connection with the external device 3000 based on the connection information displayed on the input window for performing communication connection. For example, when the external device 3000 is the AP, wireless access is available only in the digital image-capturing apparatus 1000 on which an AP setting operation is performed by using a particular user authentication key (e.g., a WPA key), so that the digital image-capturing apparatus 1000 has to undergo the AP setting operation. The AP setting operation is called a Wi-Fi setting, and the user authentication key that is used in the AP setting operation may include at least one of a user-designated ID (e.g., an SSID) and a encryption key by a user that divides groups of a wireless LAN. When the digital image-capturing apparatus 1000 is enabled to wirelessly access the external device 3000 after the AP setting operation, the digital image-capturing apparatus 1000 may access the internet via the wireless LAN called Wi-Fi. Thus, the user may use high speed internet by using the digital image-capturing apparatus 1000 within a predetermined range from where the AP is installed.

When the external device 3000 includes at least one of the SNS server or the cloud service server, the external device 3000 may access the server. The digital image-capturing apparatus 1000 when accessing the server may directly upload content including an image or a moving picture, which is captured by the digital image-capturing apparatus 1000, to the server. Compared to a case in which the content that is captured by the digital image-capturing apparatus 1000 is transmitted to the mobile communication terminal 2000 having a definition lower than a definition of the digital image-capturing apparatus 1000 and then the content is uploaded to the server by using a wireless communication function of the mobile communication terminal 2000, when the content is directly uploaded from the digital image-capturing apparatus 1000, content having a high definition may be uploaded to the server. Also, since an image or moving picture may be captured and stored and then may be immediately uploaded to the server without connection to a PC, it is possible to rapidly and conveniently manage content in the server.

FIG. 4 is a flowchart for a method of managing, by the digital image-capturing apparatus 1000, a plurality of pieces of connection information received from one or more mobile communication terminals 2000, for each of the one or more mobile communication terminals 2000, according to an embodiment.

In operation S300, the mobile communication terminal 2000 provides an ID value of the mobile communication terminal 2000 to the digital image-capturing apparatus 1000. The ID value of the mobile communication terminal 2000 may include a type, a model name, or specification which are related to the mobile communication terminal 2000, and may further include a type of an operating system installed in the mobile communication terminal 2000.

The ID value of the mobile communication terminal 2000 may be received from the mobile communication terminal 2000 in response to a request from the digital image-capturing apparatus 1000 connected via NFC 120. Also, when an application is executed in the mobile communication terminal 2000, the ID value of the mobile communication terminal 2000 may be provided to the digital image-capturing apparatus 1000.

The digital image-capturing apparatus 1000 may receive ID values of one or more mobile communication terminals 2000, respectively, from the one or more mobile communication terminals 2000 that are connected with the digital image-capturing apparatus 1000 via the NFC 120. The digital image-capturing apparatus 1000 that receives the ID value of the mobile communication terminal 2000 from the mobile communication terminal 2000 may be selected in response to a user input via a digital image-capturing apparatus selection list displayed on the mobile communication terminal 2000.

The ID value of the mobile communication terminal 2000 which is received by the digital image-capturing apparatus 1000 is used for the digital image-capturing apparatus 1000 to display a mobile communication terminal selection list. The mobile communication terminal selection list may be used for the digital image-capturing apparatus 1000 to display the one or more mobile communication terminals 2000 that are connected with the digital image-capturing apparatus 1000 via the NFC 120. Also, the ID values of the one or more mobile communication terminals 2000 may be used to divide and store the plurality of pieces of connection information received from one or more mobile communication terminals 2000, according to the one or more mobile communication terminals 2000.

In operation S310, the digital image-capturing apparatus 1000 receives the connection information from the mobile communication terminal 2000. The digital image-capturing apparatus 1000 may receive the connection information from the mobile communication terminal 2000 that is connected via the NFC 120. The digital image-capturing apparatus 1000 may be selected from a digital image-capturing apparatus selection list of the mobile communication terminal 2000. Also, the mobile communication terminal 2000 may indicate the one or more mobile communication terminals 2000 that provide the ID values in operation S300. The connection information may be used for the digital image-capturing apparatus 1000 to perform communication with the external device 3000 and may be selected from a connection information selection list in the mobile communication terminal 2000. For example, when the external device 3000 is an AP, the connection information may include at least one of Wi-Fi connection information, an SSID and password, a user ID, an e-mail, or an address response. Also, when the external device 3000 is a server, the connection information may include at least one of an ID, an e-mail, or a password of a user. Also, the connection information may be used for the mobile communication terminal 2000 to perform communication with the external device 3000.

In operation S320, the digital image-capturing apparatus 1000 divides and stores the plurality of pieces of connection information received from the one or more mobile communication terminals 2000, based on the ID values of the one or more mobile communication terminals 2000. When the one or more mobile communication terminals 2000 are connected with the digital image-capturing apparatus 1000 via the NFC 120, the digital image-capturing apparatus 1000 is configured to recognize which connection information is received from which mobile communication terminal 2000 via the NFC 120. In order to divide the plurality of pieces of connection information, the digital image-capturing apparatus 1000 divides and stores the plurality of pieces of connection information received from the one or more mobile communication terminals 2000, based on the ID values of the one or more mobile communication terminals 2000.

The plurality of pieces of connection information received from the one or more mobile communication terminals 2000 may be divided based on the ID values of the one or more mobile communication terminals 2000 and then may be stored. The plurality of pieces of connection information that are stored in the aforementioned manner may be repeatedly used at a later time in the digital image-capturing apparatus 1000, and may be easily managed according to the one or more mobile communication terminals 2000. For example, when the digital image-capturing apparatus 1000 receives new connection information from the mobile communication terminal 2000 having the same ID value, the digital image-capturing apparatus 1000 may compare the new connection information with previously stored connection information and then may perform synchronization. Thus, synchronization with respect to connection information may be easily performed between the digital image-capturing apparatus 1000 and the mobile communication terminal 2000. This will be shown in a flowchart of FIG. 9.

In operation S330, the digital image-capturing apparatus 1000 displays the mobile communication terminal selection list, based on the ID values of the one or more mobile communication terminals 2000 which are received in operation S300. The mobile communication terminal selection list may be used for the digital image-capturing apparatus 1000 to display the one or more mobile communication terminals 2000 that are connected with the digital image-capturing apparatus 1000 via the NFC 120. Also, when the mobile communication terminal 2000 is selected in response to a user input via the mobile communication terminal selection list displayed on the digital image-capturing apparatus 1000, the digital image-capturing apparatus 1000 may display the connection information that is received from the mobile communication terminal 2000.

Figure 10:
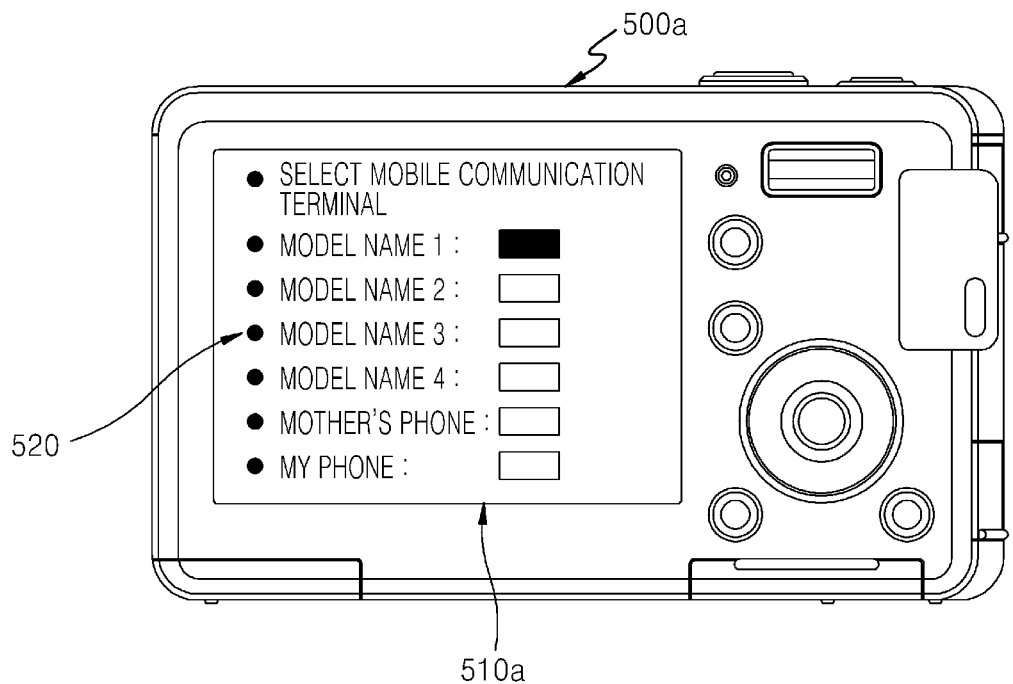
FIG. 10 illustrates an example display of the digital image-capturing apparatus of FIG. 1 in which a mobile communication terminal selection list is displayed, according to another embodiment.

In order to distinguish between the one or more mobile communication terminals 2000 in the mobile communication terminal selection list, model names of the one or more mobile communication terminals 2000 may be used as ID information displayed on the digital image-capturing apparatus 1000. Also, a user may set the ID information by directly inputting the ID information. FIG. 10 illustrates an example display 510a of a digital image-capturing apparatus 500a in which a mobile communication terminal selection list 520 is displayed, according to another embodiment.

In operation S340, the plurality of pieces of connection information received from the one or more mobile communication terminals 2000 that are selected from the mobile communication terminal selection list are displayed. Here, the plurality of pieces of received connection information may be displayed while they are enabled to be selected. The plurality of pieces of displayed connection information may be the ones that are stored in operation S320. Accordingly, when the digital image-capturing apparatus 1000 receives the plurality of pieces of connection information from the one or more mobile communication terminals 2000, the digital image-capturing apparatus 1000 divides and manages the plurality of pieces of connection information based on the one or more mobile communication terminals 2000, respectively, so that the user may easily manage the plurality of pieces of connection information.

For example, the plurality of pieces of connection information received from the one or more mobile communication terminals 2000 may be displayed on the connection information selection list as in operation S240 of the flowchart of FIG. 3. That is, when the digital image-capturing apparatus 1000 displays the connection information, the digital image-capturing apparatus 1000 may display the connection information by using the same item name in the connection information selection list of the mobile communication terminal 2000 that has provided the connection information. Also, the user may directly input an item name that corresponds to the connection information in the digital image-capturing apparatus 1000. Thus, the user may easily recognize which connection information is received from which mobile communication terminal 2000, by using the digital image-capturing apparatus 1000.

Figure 11:
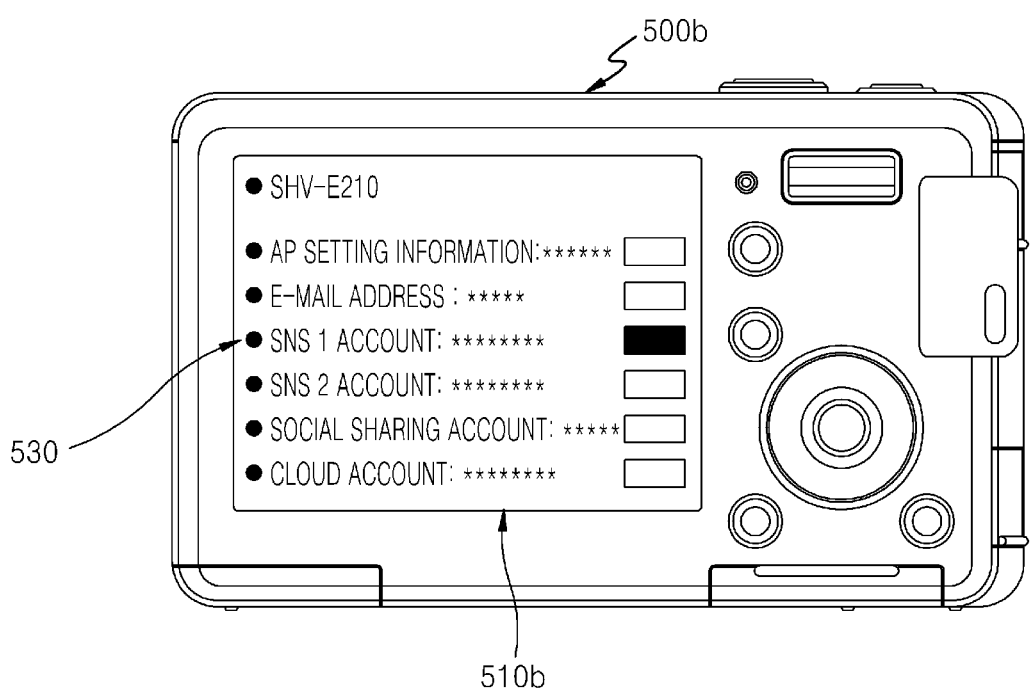
FIG. 11 illustrates an example display of the digital image-capturing apparatus of FIG. 1 in which one or more pieces of connection information received from a mobile communication terminal that is selected from the mobile communication terminal selection list is displayed, according to an embodiment.

FIG. 11 illustrates an example display 510b of a digital image-capturing apparatus 500b in which one or more pieces of connection information 530 received from the mobile communication terminal 2000 that is selected from the mobile communication terminal selection list is displayed, according to an embodiment.

In operation S350, a connection information input window of an application that corresponds to the connection information selected from the plurality of pieces of connection information which are displayed in operation S340 is displayed.

The application that corresponds to the connection information may be used for the digital image-capturing apparatus 1000 to perform communication connection with the external device 3000. For example, the connection information selected in the digital image-capturing apparatus 1000 is used in performing communication connection with the AP, and the application allows the digital image-capturing apparatus 1000 to perform the communication connection with the AP. The connection information input window may include one or more fields to which AP setting information including authentication, data encryption, and the like is input. In this regard, for example, the connection information input window of the application may be illustrated as display 400a shown in FIG. 6A.

When the connection information selected in the digital image-capturing apparatus 1000 is used in performing communication connection with the server, the connection information input window may include a field to which the ID, the e-mail, and the password of the user are input. In this regard, for example, the connection information input window of the application may be illustrated as in displays 400b and 400c as shown in FIGS. 6B and 6C, respectively.

In operation S360, the selected connection information is input to the connection information input window of the application displayed in operation S350. When the digital image-capturing apparatus 1000 selects the displayed connection information, the selected connection information may be input to a connection information input window that is provided by an application corresponding to the selected connection information. The aforementioned connection information may include a combination of numbers, letters, and special characters, and thus, it may be inconvenient to input the connection information by using a touch panel or by manipulating keys of the digital image-capturing apparatus 1000 that does not have a highly-functional input interface.

Figure 12:
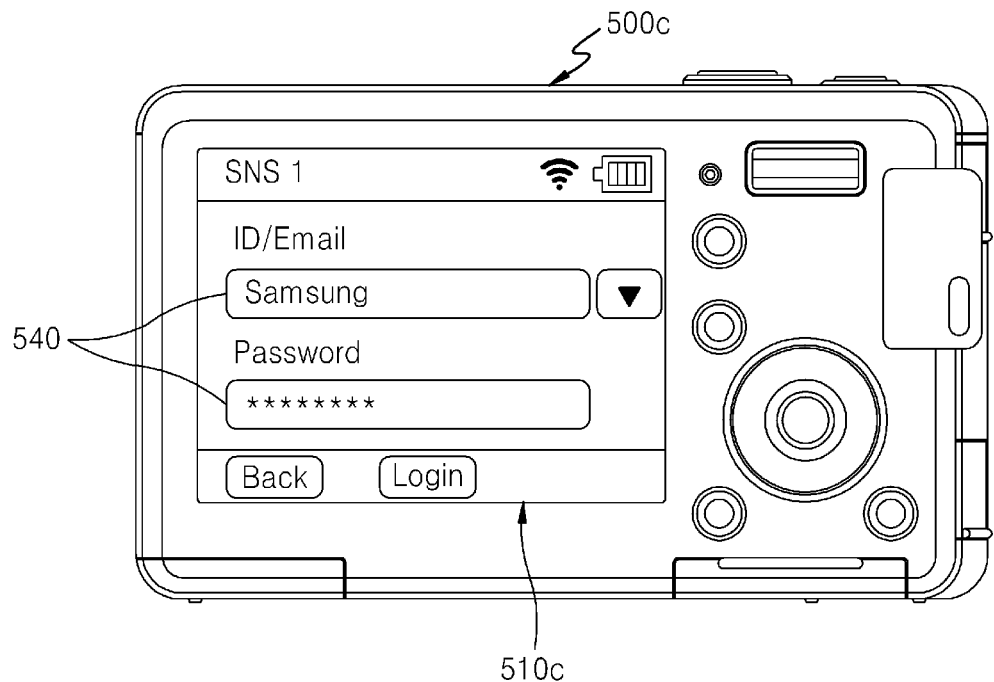
FIG. 12 illustrates an example display of the digital image-capturing apparatus of FIG. 1 in which a connection information input window of an application corresponding to the connection information selected in the embodiment of FIG. 11 is displayed, according to an embodiment.

Thus, in the one or more embodiments, since the digital image-capturing apparatus 1000 selects connection information based on a user input, the selected connection information is directly input to a connection information input window of an application corresponding to the selected connection information, so that the user is not required to directly input the selected connection information to the connection information input window of the application by using an input interface of the digital image-capturing apparatus 1000. This is illustrated in FIG. 12.

FIG. 5A illustrates an example display 300a in which the mobile communication terminal 2000 displays a digital image-capturing apparatus selection list 310, according to an embodiment. For example, FIG. 5A shows that the mobile communication terminal 2000 displays the digital image-capturing apparatus selection list in operation S220 of the flowchart of FIG. 3.

The digital image-capturing apparatus selection list shows one or more digital image-capturing apparatuses 1000 that are connected with the mobile communication terminal 2000 via the NFC 120. In order to distinguish between the one or more digital image-capturing apparatuses 1000 in the digital image-capturing apparatus selection list, ID information may be used. For example, the ID information may include a model name of the digital image-capturing apparatus 1000 or may be directly set by the user. In order for the user to set the ID information, the user may directly set the ID information in the mobile communication terminal 2000.

Also, the digital image-capturing apparatus selection list is used to select the digital image-capturing apparatus 1000 that is to receive connection information from the mobile communication terminal 2000, and in this regard, icons may be displayed to the right of a plurality of pieces of ID information, respectively. The icons may be used in selection of the digital image-capturing apparatus 1000, in response to a user input. For example, referring to FIG. 5A, the digital image-capturing apparatus selection list shows model names of the digital image-capturing apparatuses 1000 and rectangular icons to the right of the model names. In this regard, when an icon at a right side of a model name 1 is selected and thus, for example, turns red in response to a user input, this status may mean that the digital image-capturing apparatus 1000 corresponding to the model name 1 is selected as the digital image-capturing apparatus 1000 to receive predetermined information from the mobile communication terminal 2000.

FIGS. 5B and 5C illustrate example displays 300b and 300c, respectively, in which the mobile communication terminal 2000 displays the connection information selection list, according to embodiments. For example, FIG. 5B shows that the mobile communication terminal 2000 displays the connection information selection list in operation S240 of the flowchart of FIG. 3. That is, FIG. 5B illustrates which connection information is to be provided from the mobile communication terminal 2000 to the digital image-capturing apparatus 1000 corresponding to the model name 1 that is selected in the embodiment of FIG. 5A. Since connection information that is used for the digital image-capturing apparatus 1000 to be connected with the external device 3000 varies based on types of the external device 3000, the plurality of pieces of connection information in the connection information selection list are divided and stored.

For example, when the external device 3000 is the AP, the plurality of pieces of connection information may be divided into items of the AP setting information, and then corresponding connection information may be stored in the mobile communication terminal 2000. Also, when the external device 3000 is the server, the plurality of pieces of connection information may be divided into items such as "e-mail address", "SNS1 account", or the like, based on a type of the server, and then corresponding connection information may be stored in the mobile communication terminal 2000. The items may be directly changed (i.e., entered, deleted, and amended) by a user in the mobile communication terminal 2000. For example, when the user does not use an SNS1 server, the item "SNS1 account" may be deleted from the connection information selection list. Also, when another server is used, an item corresponding to the other server may be generated. Also, the item displayed on the mobile communication terminal 2000 may be amended from "e-mail address" to "e-mail 2 address". Similarly, the plurality of pieces of connection information which are stored as items of the connection information selection list may be changed (i.e., entered, deleted, and amended) by the user.

The connection information selection list is used when an item of connection information to be provided from the mobile communication terminal 2000 to the digital image-capturing apparatus 1000 is selected, and in this regard, icons may be displayed to the right of the items, respectively. The icons may be used when connection information is selected in the mobile communication terminal 2000, in response to a user input. For example, when the user touches the icon on a touch panel of the mobile communication terminal 2000 or selects the icon by pressing an input button, connection information that is stored in an item at a right side of the icon may be selected. The connection information selection list may include an icon for displaying a user input, or another piece of information, other than the items.

FIG. 5C illustrates an example display 300c of the mobile communication terminal 2000 in which the selected connection information 320 to be transmitted to the digital image-capturing apparatus 1000 is displayed by the mobile communication terminal 2000, in response to a user input, according to an embodiment. In FIG. 5C, a user may select icons by touching the icons on a touch panel of the mobile communication terminal 2000 (e.g., on display 300c or by pressing an input button), where the icons are displayed to the right of items of "AP connection information", "e-mail address", "SNS1 account", and "cloud account". In this case, a plurality of pieces of connection information stored in the items of "AP connection information", "e-mail address", "SNS1 account", and "cloud account" may be provided to the digital image-capturing apparatus 1000 via the NFC 120, when a button "transmission" displayed at a lower right corner of the connection information selection list is selected.

FIGS. 6A, 6B, and 6C illustrate example displays 400a, 400b, and 400c, respectively of the mobile communication terminal 2000 in which connection information is displayed in a connection information input window for performing communication connection between the digital image-capturing apparatus 1000 and the external device 3000, according to embodiments.

FIG. 6A illustrates the example display 400a in which the digital image-capturing apparatus 1000 inputs connection information 410a to the connection information input window so as to perform communication connection with an AP that is the external device 3000. The digital image-capturing apparatus 1000 may input a plurality of pieces of connection information received from one or more mobile communication terminals 2000 while the plurality of pieces of connection information correspond to fields of the connection information input window for the communication connection with the AP. When the digital image-capturing apparatus 1000 receives the connection information from the mobile communication terminal 2000, the digital image-capturing apparatus 1000 may automatically input the connection information to the connection information input window. Also, by performing simple manipulation in the digital image-capturing apparatus 1000 that has received the connection information, the connection information may be immediately input to the connection information input window. Thus, a user is not required to directly input the connection information in the digital image-capturing apparatus 1000 having a relatively inconvenient key input function. The connection information that is displayed in a 'Network Password' field may be shown as a special character "*" for security. In this regard, the special character "*" is only shown, and what is actually input to the field is the connection information.

After the connection information is displayed on each field of the connection information input window, when a button "OK" at a lower corner of the connection information input window of the digital image-capturing apparatus 1000 is selected, user authentication for the AP connection is performed by using the connection information input to the connection information input window. When the user authentication is successful, the digital image-capturing apparatus 1000 may use wireless LAN internet via the AP.

FIG. 6B illustrates the example display 400b in which, when a server is to be connected with the digital image-capturing apparatus 1000 via an e-mail account, connection information 410b (e.g., the connection information may include an e-mail address) received from the mobile communication terminal 2000 is displayed in a "sender" field of a connection information input window in the digital image-capturing apparatus 1000. After the connection information is displayed on each field of the connection information input window, when a button "NEXT" at a lower corner of the connection information input window of the digital image-capturing apparatus 1000 is selected, a predetermined e-mail may be input to a "receiver" field of the connection information input window. When a predetermined e-mail is displayed in the "sender" field of the connection information input window, if a button "OK" is selected, content stored in the digital image-capturing apparatus 1000 or content captured by using the digital image-capturing apparatus 1000 may be transmitted from the e-mail account in the "sender" field to the e-mail account in the "receiver" field. In this case, the content may not be uploaded after connecting the digital image-capturing apparatus 1000 to a PC but may be directly transmitted from the digital image-capturing apparatus 1000 to the predetermined e-mail account. In the one or more embodiments, the content may include at least one of still image content (e.g., a picture, a painting, or the like), text content (e.g., a poem, a novel, a letter, a work file, detailed description about content, or the like), moving picture content (e.g., a personal image, a movie, a music video, a TV program image, or the like), music content (e.g., music, concert music, radio, or the like), and event content (e.g., a schedule, an anniversary, a travel plan, or the like). That is, the content in the one or more embodiments may include not only multimedia content but also may include various types of content.

FIG. 6C illustrates the example display 400c in which, in order to perform communication connection with an SNS1 server that is the external device 3000, the digital image-capturing apparatus 1000 displays connection information 410c (e.g., the connection information may include an ID and/or a password) received from the mobile communication terminal 2000 to an "ID/Email" field and a "Password" field of a connection information input window for the communication connection between the digital image-capturing apparatus 1000 and an SNS1 server. The connection information that is displayed in the "Password" field may be shown as a special character "*" for security. In this regard, the special character "*" is only shown, and what is actually input to the field is the connection information. When a user inputs a signal so as to execute the SNS1 server, the digital image-capturing apparatus 1000 may drive an SNS1 driving program stored in a memory, thereby allowing an access to the SNS1 server. For example, as illustrated in FIG. 6C, after the connection information is displayed on each field of the connection information input window, when a button "Login" at a lower corner of the connection information input window of the digital image-capturing apparatus 1000 is selected, the digital image-capturing apparatus 1000 may access the SNS1 server by using the connection information input in each field. When a "Back" button is selected, fields of the connection information input window for performing communication connection may be blank.

Figure 7:
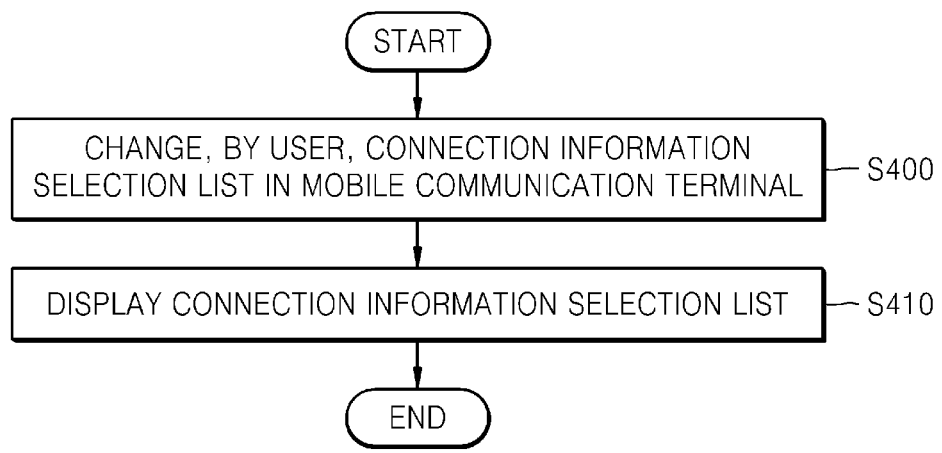
FIG. 7 is a flowchart for a method by which the mobile communication terminal of FIG. 1 changes a connection information selection list to be provided to the digital image-capturing apparatus, according to an embodiment.

FIG. 7 is a flowchart for a method by which the mobile communication terminal 2000 changes a connection information selection list to be provided to the digital image-capturing apparatus 1000, according to an embodiment.

In operation S400, a user changes the connection information selection list in the mobile communication terminal 2000. The connection information selection list may correspond to the digital image-capturing apparatus 1000 that is selected based on a user input via a digital image-capturing apparatus selection list. The user may directly enter, delete, or amend an item of the connection information selection list in the mobile communication terminal 2000.

In operation S410, the changed connection information selection list is displayed.

Figure 8:
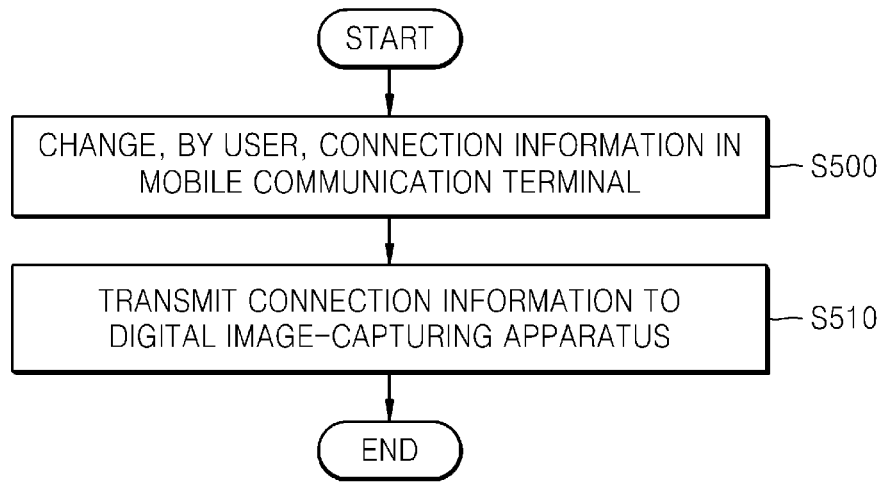
FIG. 8 is a flowchart for a method of changing connection information in the digital image-capturing apparatus of FIG. 1, according to an embodiment.

FIG. 8 is a flowchart for a method of changing connection information in the digital image-capturing apparatus 1000, according to an embodiment.

In operation S500, a user changes the connection information in the mobile communication terminal 2000. The connection information to be transmitted to the digital image-capturing apparatus 1000 may be entered, deleted, or amended in the mobile communication terminal 2000, by the user.

In operation S510, the changed connection information is transmitted to the digital image-capturing apparatus 1000.

Figure 9:
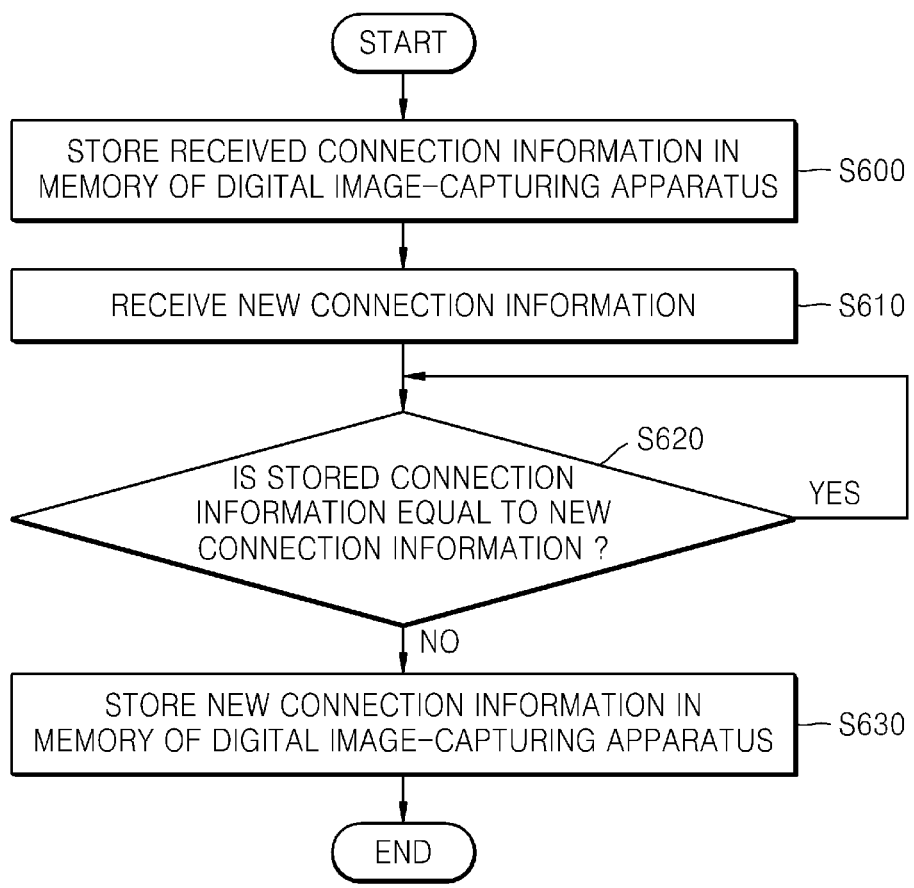
FIG. 9 is a flowchart for a method by which the digital image-capturing apparatus of FIG. 1 synchronizes its connection information with new connection information from the mobile communication terminal, according to an embodiment.

FIG. 9 is a flowchart for a method by which the digital image-capturing apparatus 1000 synchronizes its connection information with new connection information from the mobile communication terminal 2000, according to an embodiment.

In operation S600, the digital image-capturing apparatus 1000 receives connection information from the mobile communication terminal 2000 via NFC 120 and stores the connection information in the memory 60. The memory 60 of the digital image-capturing apparatus 1000 may store a program to drive the CPU 100 of the digital image-capturing apparatus 1000, and may temporarily store a plurality of pieces of data (e.g., a message, a still image, a moving picture, or the like) that are input or output. For example, the digital image-capturing apparatus 1000 stores predetermined connection information from the mobile communication terminal 2000 in a flash ROM, so that the connection information stored in the flash ROM may be directly used by the digital image-capturing apparatus 1000 without requiring receipt of the connection information again from the mobile communication terminal 2000. The digital image-capturing apparatus 1000 divides a plurality of pieces of connection information received from the mobile communication terminal 2000, based on ID values received from the mobile communication terminal 2000, and stores the plurality of pieces of connection information in the memory 60. That is, the plurality of pieces of connection information that are received from the mobile communication terminal 2000 to the digital image-capturing apparatus 1000 via NFC 120 and that are divided based on the ID values of the mobile communication terminal 2000 may be stored in the memory 60.

In operation S610, the digital image-capturing apparatus 1000 receives new connection information from the mobile communication terminal 2000 that previously provided the connection information to the digital image-capturing apparatus 1000. The mobile communication terminal 2000 that provides the new connection information to the digital image-capturing apparatus 1000 may have already provided connection information to the digital image-capturing apparatus 1000 more than once. In this case, an ID value of the mobile communication terminal 2000 may be already stored in the memory 60 of the digital image-capturing apparatus 1000. The new connection information from the mobile communication terminal 2000 has to be used in a same way as the connection information that is previously stored in the memory 60 of the digital image-capturing apparatus 1000 is used. That is, if the connection information stored in the memory 60 in operation S600 is used for the digital image-capturing apparatus 1000 to perform communication connection with a server, the new connection information received in operation S610 has to be used for the digital image-capturing apparatus 1000 to perform the communication connection with the server. Similarly, if the connection information stored in the memory 60 in operation S600 is used for the digital image-capturing apparatus 1000 to perform communication connection with an AP, the new connection information received in operation S610 has to be used for the digital image-capturing apparatus 1000 to perform the communication connection with the AP. If the connection information stored in the memory 60 of the digital image-capturing apparatus 1000 and the new connection information are used in communication connection with different external devices 300, it is not necessary to update the connection information stored in the memory 60 of the digital image-capturing apparatus 1000 by using the new connection information.

In operation S620, it is determined whether the connection information that is already stored in the memory 60 of the digital image-capturing apparatus 1000 is equal to the new connection information received from the mobile communication terminal 2000.

The stored connection information and the new connection information that are compared in operation S620 may be provided from the same mobile communication terminal 2000 to the same digital image-capturing apparatus 1000 and in this case have to be input to same fields of a same connection information input window displayed on the digital image-capturing apparatus 1000. The connection information input window may be used for the digital image-capturing apparatus 1000 to perform the communication connection with the same external device 3000.

In operation S630, when the connection information that is already stored in the memory 60 of the digital image-capturing apparatus 1000 is not equal to the new connection information received from the mobile communication terminal 2000, the new connection information is newly stored in the memory 60 of the digital image-capturing apparatus 1000 in which the previous connection information has been stored. If the connection information that is already stored in the memory 60 of the digital image-capturing apparatus 1000 is not equal to the new connection information received from the mobile communication terminal 2000, this may mean that the new connection information includes a change. The change may be incurred by a user since the user may directly amend, enter, or delete the connection information in the mobile communication terminal 2000. For example, the fact that connection information used in an access to wireless LAN internet is changed may mean that the digital image-capturing apparatus 1000 attempts to be connected to another wireless LAN internet that requires new AP connection information. Also, the fact that connection information used in an access to a predetermined server is changed may mean that at least one of an ID, an e-mail, and a password of the user is changed by a user.

Thus, when the connection information stored in the memory 60 of the digital image-capturing apparatus 1000 is changed (i.e., amended, deleted, or entered) by the user, the changed connection information may be newly stored in the memory 60 of the digital image-capturing apparatus 1000. By doing so, when the connection information used for the digital image-capturing apparatus 1000 to perform the communication connection with the external device 3000 is changed, the user need not directly input the change to the digital image-capturing apparatus 1000 but may input the change to the mobile communication terminal 2000 having a more convenient input user interface than the digital image-capturing apparatus 1000, and the changed connection information may be provided from the mobile communication terminal 2000 to the digital image-capturing apparatus 1000. Accordingly, the new connection information may be easily synchronized with the digital image-capturing apparatus 1000. Also, when the connection information that is already stored in the memory 60 of the digital image-capturing apparatus 1000 is equal to the new connection information received from the mobile communication terminal 2000, this means that the connection information is not changed. In this case, the connection information that is already stored in the memory 60 of the digital image-capturing apparatus 1000 may be re-used for the digital image-capturing apparatus 1000 to perform communication connection with the external device 3000 at a later time.

FIG. 10 illustrates an example display 500a of the digital image-capturing apparatus 1000 in which a mobile communication terminal selection list 520 is displayed, according to another embodiment. When the digital image-capturing apparatus 1000 receives ID values of one or more mobile communication terminals 2000 from the one or more mobile communication terminals 2000, respectively, which are connected via NFC 120, the digital image-capturing apparatus 1000 may receive a plurality of the ID values. Thus, the ID values based on the one or more mobile communication terminals 2000 may be divided. In order to distinguish between the one or more mobile communication terminals 2000 in the mobile communication terminal selection list 520, ID information may be used. The ID information may be a model name of the mobile communication terminal 2000 or may be directly set by a user. For example, as illustrated in FIG. 10, when a model name of the mobile communication terminal 2000 corresponding to an ID value 1 provided to the digital image-capturing apparatus 1000 is "model name 1", the "model name 1" may be displayed as the ID information in the mobile communication terminal selection list. Also, when a model name of the mobile communication terminal 2000 corresponding to an ID value 2 provided to the digital image-capturing apparatus 1000 is "model name 2", the "model name 2" may be displayed as the ID information in the mobile communication terminal selection list. In another embodiment, when a user of the mobile communication terminal 2000 corresponding to an ID value 5 provided to the digital image-capturing apparatus 1000 is a user's mother, the user may set "mother's phone" as the ID information in the digital image-capturing apparatus 1000. In order to select the mobile communication terminal 2000 from the mobile communication terminal selection list in response to a user input, icons may also be displayed to the right of a plurality of pieces of the ID information. For example, as illustrated in FIG. 10, the mobile communication terminal selection list 520 may display model names of the one or more mobile communication terminals 2000, a plurality of pieces of the ID information directly set in the digital image-capturing apparatus 500a by the user, and the icons having a rectangular shape to the right thereof. When an icon at a right side of "model name 1" is selected and thus, for example, turns red in response to a user input, this may mean that the mobile communication terminal 2000 corresponding to "model name 1" is selected.

FIG. 11 illustrates an example display 510b of a digital image-capturing apparatus 500b in which connection information 530 that is received from the mobile communication terminal 2000 selected from a mobile communication terminal selection list is displayed, according to another embodiment. As illustrated in FIG. 10, when "model name 1" is selected from the mobile communication terminal selection list 520, as illustrated in FIG. 11, the digital image-capturing apparatus 500b may display connection information 530 received from the mobile communication terminal 2000 having an ID value that corresponds to "model name 1". When the digital image-capturing apparatus 500b receives one or more pieces of connection information from the mobile communication terminal 2000, the one or more pieces of connection information may be divided based on types of the external devices 3000 and then to be displayed. Thus, as illustrated in FIG. 11, the one or more pieces of connection information may be displayed as items such as "AP connection information", "e-mail address", "SNS1 account', or the like.

FIG. 12 illustrates an example display 510c of a digital image-capturing apparatus 500c in which a connection information input window of an application corresponding to the connection information selected in the embodiment of FIG. 11 is displayed, according to an embodiment. An item of connection information 540 from among one or more pieces of connection information displayed as in FIG. 11 may be selected in response to a user input. When an item of "SNS1 account' is selected in the embodiment of FIG. 11, the digital image-capturing apparatus 1000 may display the selected connection information on a connection information input window of an application to access an SNS1 server. That is, in order for the digital image-capturing apparatus 1000 to perform communication connection with the SNS1 server, the digital image-capturing apparatus 1000 requires at least one of an ID, an e-mail and a password of a user, and in this regard, the user may not need to directly input one of the ID, the e-mail and the password to the digital image-capturing apparatus 1000 but may fetch and input the connection information that is received from the mobile communication terminal 2000 and then stored in the memory 60 of the digital image-capturing apparatus 1000. When "Login" shown in FIG. 12 is selected, the digital image-capturing apparatus 1000 may access the SNS1 server by using the connection information that is input to a connection information input window.

Figure 13:
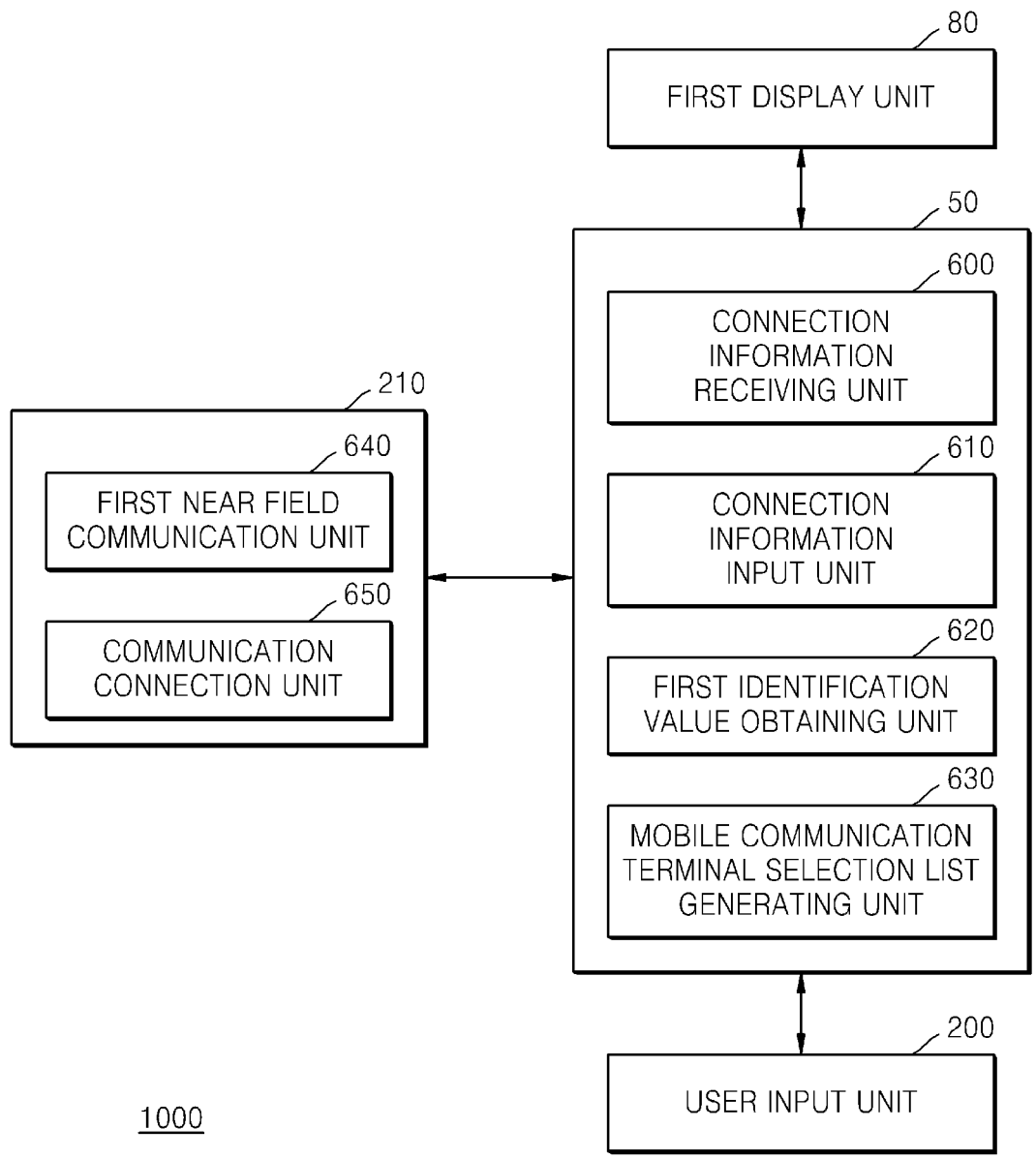
FIG. 13 is a block diagram illustrating a communication unit and a digital signal processing unit of the digital image-capturing apparatus of FIG. 1, according to an embodiment.

FIG. 13 is a block diagram illustrating the communication unit 210 and the digital signal processing unit 50 of the digital image-capturing apparatus 1000, according to an embodiment.

The communication unit 210 is used by the digital image-capturing apparatus 1000 to perform communication connection with another device, and includes a first near field communication (NFC) unit 640 and a communication connection unit 650.

The first NFC unit 640 may transmit and receive at least one of connection information, an ID value of the mobile communication terminal 2000, or an ID value of the digital image-capturing apparatus 1000 between the mobile communication terminal 2000 and the digital image-capturing apparatus 1000. The first NFC unit 640 may use communication standards such as Bluetooth, Radio Frequency Identification (RFID), infrared Data Association (IrDA), Ultra Wideband (UWB), ZigBee, NFC, Wi-Fi Direct, or the like. For example, a Wi-Fi Direct network has a concept similar to a Peer to Peer (P2P) network, and in this regard, the digital image-capturing apparatus 1000 and the mobile communication terminal 2000 in the Wi-Fi Direct network may be directly connected to each other without using a WLAN AP. To do so, the digital image-capturing apparatus 1000 may implement a new firmware protocol.

The communication connection unit 650 may include one or more elements for performing communication connection between the digital image-capturing apparatus 1000 and the external device 3000. For example, the communication connection unit 650 may include a mobile communication unit (not shown), a wireless internet unit (not shown), or the like. The mobile communication unit exchanges a wireless signal with at least one of a base station, an external terminal, or a server in a mobile communication network. Here, the wireless signal may include a voice call signal, a videotelephony call signal, or various types of data based on transmission or reception of texts/multimedia messages. The wireless internet unit may be for accessing wireless internet and may be embedded in the digital image-capturing apparatus 1000 or may be externally attached.

The digital signal processing unit 50 includes a connection information receiving unit 600, a connection information input unit 610, a first identification (ID) value obtaining unit 620, and a mobile communication terminal selection list generating unit 630.

The connection information receiving unit 600 receives connection information from the mobile communication terminal 2000 that is connected with the digital image-capturing apparatus 1000 via NFC 120. The connection information receiving unit 600 may receive the connection information from the mobile communication terminal 2000 via the first NFC unit 640. For example, the connection information received from the mobile communication terminal 2000 is used for the digital image-capturing apparatus 1000 to perform communication connection with the external device 3000. Also, the connection information may be used for the mobile communication terminal 2000 to perform communication connection with the external device 3000. For example, when the external device 3000 is an AP, the connection information may include AP setting information, and when the external device 3000 is a server, the connection information may include at least one of an ID, an e-mail, or a password of a user.

The connection information input unit 610 inputs the connection information, which is received from the connection information receiving unit 600, to an input window for performing communication connection with the external device 3000. The connection information input unit 610 allows the connection information to be automatically input to the input window for performing communication connection with the external device 3000, wherein the connection information is not directly input by the user via the user input unit 200 of the digital image-capturing apparatus 1000 but is read from the memory 60 that stores already-received connection information.

The first ID value obtaining unit 620 receives the ID value of the mobile communication terminal 2000 from the mobile communication terminal 2000. The first ID value obtaining unit 620 may receive the ID value of the mobile communication terminal 2000 from the mobile communication terminal 2000 that is connected with the digital image-capturing apparatus 1000 via the NFC 120, in response to a request from the digital image-capturing apparatus 1000. The first ID value obtaining unit 620 may receive the ID value of the mobile communication terminal 2000 from the mobile communication terminal 2000 via the first NFC unit 640. Also, the first ID value obtaining unit 620 may receive the ID value of the mobile communication terminal 2000 which is automatically provided from the mobile communication terminal 2000 that is connected with the digital image-capturing apparatus 1000 via the NFC 120. The ID value obtained by the first ID value obtaining unit 620 may be stored in the memory 60 of the digital image-capturing apparatus 1000.

The mobile communication terminal selection list generating unit 630 generates a mobile communication terminal selection list, based on the ID value obtained by the first ID value obtaining unit 620.

In order to distinguish between one or more mobile communication terminals 2000, ID information may be used in the mobile communication terminal selection list. The ID information may indicate a model name of the mobile communication terminal 2000. Also, the user may directly set ID information that indicates the mobile communication terminal 2000 in the digital image-capturing apparatus 1000.

The user input unit 200 generates input data so as to allow the user to control an operation of the digital image-capturing apparatus 1000. The user input unit 200 may include one or more of a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, a jog switch, or the like. In particular, when the touch pad is integrated as a mutual layer structure with the first display unit 80, this structure may be called a touch screen. According to the present embodiment, the mobile communication terminal 2000 may be selected from the mobile communication terminal selection list, and connection information to be displayed on the digital image-capturing apparatus 1000 may be selected from a plurality of pieces of connection information, via the user input unit 200 in the digital image-capturing apparatus 1000.

The first display unit 80 may include at least one of a liquid crystal display (LDC), a thin film transistor-liquid crystal display (TFT-LCD), an organic light-emitting diode, a flexible display, or a three-dimensional (3D) display.

When the touch pad is integrated as the mutual layer structure with the first display unit 80, and thus is configured as the touch screen, the first display unit 80 may be used as an input device as well as an output device. The touch screen may detect a position of a touch input, a touched area, and a pressure of the touch input. Also, the touch screen may detect not only a real touch but also may detect a proximity touch. According to the present embodiment, the digital image-capturing apparatus 1000 may display the mobile communication terminal selection list. Also, the digital image-capturing apparatus 1000 may display connection information that is received from the mobile communication terminal 2000 selected from the mobile communication terminal selection list. Also, the digital image-capturing apparatus 1000 may display an input window for performing communication connection between the digital image-capturing apparatus 1000 and the external device 3000.

Also, a plurality of pieces of the received connection information may be divided based on the ID values obtained by the ID value obtaining unit 620 and may be stored in the memory 60 of the digital image-capturing apparatus 1000 shown in FIG. 2.

The memory 60 may store a program for processing and controlling the digital signal processing unit 50, and may function to temporarily store a plurality of pieces of input and output data (e.g., a phone book, messages, still images, moving pictures, or the like).

The memory 60 may be a storage medium including at least one of a flash memory, a hard disk, a multimedia card micro memory, a card type memory such as a secure digital (SD) memory card or an xD memory card, a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disc, or an optical disc. Also, the digital image-capturing apparatus 1000 may perform web storage that involves an internet storage function of the memory 60.

Figure 14:
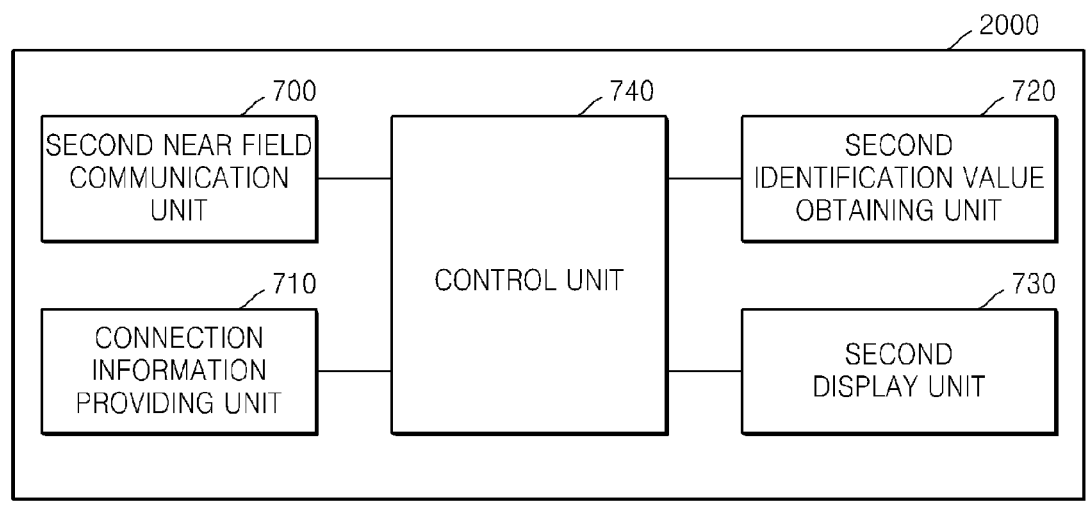
FIG. 14 is a block diagram of the mobile communication terminal of FIG. 1, according to an embodiment.

FIG. 14 is a block diagram of the mobile communication terminal 2000, according to an embodiment. The mobile communication terminal 2000 in this case includes a second near field communication unit 700, a connection information providing unit 710, a second identification value obtaining unit 720, a second display unit 730, and a control unit 740.

The second NFC unit 700 may transmit and receive at least one of connection information, an ID value of the mobile communication terminal 2000, or an ID value of the digital image-capturing apparatus 1000 between the mobile communication terminal 2000 and the digital image-capturing apparatus 1000.

The connection information providing unit 710 provides the connection information to the digital image-capturing apparatus 1000 that is selected from a digital image-capturing apparatus selection list. The connection information providing unit 710 may provide the connection information to the digital image-capturing apparatus 1000 via the second NFC unit 700. Here, the connection information is used for the digital image-capturing apparatus 1000 to perform communication connection with the external device 3000 after the digital image-capturing apparatus 1000 receives the connection information from the mobile communication terminal 2000. Since the connection information providing unit 710 provides the connection information to the digital image-capturing apparatus 1000, inconvenience caused by inputting the connection information to the digital image-capturing apparatus 1000 via key input manipulation may be reduced.

The second identification (ID) value obtaining unit 720 receives ID values of one or more digital image-capturing apparatuses 1000 from the one or more digital image-capturing apparatuses 1000 that are connected with the mobile communication terminal 2000 via NFC 120. The second ID value obtaining unit 720 may receive the ID values of the one or more digital image-capturing apparatuses 1000 via the second NFC unit 700. The second ID value obtaining unit 720 may receive the ID values of the one or more digital image-capturing apparatuses 1000 that are connected with the mobile communication terminal 2000 via the NFC 120, in response to a request from the mobile communication terminal 2000. Also, the second ID value obtaining unit 720 may receive the ID values that are automatically provided from the one or more digital image-capturing apparatuses 1000 connected with the mobile communication terminal 2000 via the NFC 120. The ID values obtained by the second ID value obtaining unit 720 may be stored in a memory of the mobile communication terminal 2000. Also, the ID values may be used when the mobile communication terminal 2000 generates a digital image-capturing apparatus selection list. The digital image-capturing apparatus selection list is used in selection of the digital image-capturing apparatus 1000 that is to receive the connection information from the mobile communication terminal 2000 and that is selected from the one or more digital image-capturing apparatuses 1000 that are connected with the mobile communication terminal 2000 via the NFC 120.

A second display unit 730 may display the digital image-capturing apparatus selection list, based on the ID values obtained by the second ID value obtaining unit 720. Also, the second display unit 730 may display a connection information selection list for selection of the connection information to be provided to the digital image-capturing apparatus 1000 that is selected from the digital image-capturing apparatus selection list in response to a user input. Also, the second display unit 730 may display the connection information selected from the connection information selection list.

A control unit 740 controls one or more operations of the mobile communication terminal 2000. For example, the control unit 740 performs control and processing related to data communication or the like.

According to the one or more embodiments, the digital image-capturing apparatus may receive connection information for performing communication connection with an external device from the mobile communication terminal, so that a complicated input procedure may be skipped in the digital image-capturing apparatus.

Also, according to the one or more embodiments, when the digital image-capturing apparatus receives a plurality of pieces of connection information from one or more mobile communication terminals, respectively, the digital image-capturing apparatus manages the connection information for each of the one or more mobile communication terminals, so that a plurality of users may easily and conveniently use a communication function of the digital image-capturing apparatus.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of receiving, by a digital image-capturing apparatus, connection information from a mobile communication terminal, the method comprising:

receiving connection information by the digital image-capturing apparatus from a mobile communication terminal that provides the connection information to the digital image-capturing apparatus via near field communication (NFC);

inputting, b the digital the connection information to an input window of an application of the digital image-capturing apparatus for performing a communication connection between the digital image-capturing apparatus and an external device; and performing the communication connection between the digital image-capturing apparatus and the external device, based on the connection information, wherein the external device comprises at least one of an access point (AP) or a server, and wherein the connection information is used in communication with the external device.

2. The method of claim 1, further comprising:

receiving by the digital image-capturing apparatus, identification (ID) values of one or more mobile communication terminals from the one or more mobile communication terminals; and dividing and storing by the digital image-capturing apparatus, one or more pieces of the connection information based on the ID values.

3. The method of claim 2, further comprising:

displaying by the digital image-capturing apparatus, a mobile communication terminal selection list, based on the ID values; and displaying, b the digital image-capturing apparatus, connection information received from a selected mobile communication terminal that is selected from the mobile communication terminal selection list.

4. The method of claim 3, wherein the inputting of the connection information comprises:

displaying, b the digital image-capturing apparatus, the connection information received from the selected mobile communication terminal, wherein the connection information is enabled to be selected;

displaying, b the digital image-capturing apparatus, a connection information input window of the application of the digital image-capturing apparatus, the application corresponding to selected connection information; and inputting, b the digital image-capturing apparatus, the selected connection information to the connection information input window of the application.

5. The method of claim 1, wherein the external device comprises a server that comprises at least one of a social network service (SNS) server or a cloud service server, and the connection information comprises at least one of an ID, an e-mail, or a password for connection with the server.

6. A method of providing connection information, the method performed by a mobile communication terminal and comprising:

receiving, by the mobile communication terminal, identification (ID) values of one or more digital image-capturing apparatuses from the one or more digital image-capturing apparatuses, wherein the one or more digital image-capturing apparatuses provide the ID values to the mobile communication terminal via near field communication (NFC);

displaying, by the mobile communication terminal, a digital image-capturing apparatus selection list, based on the ID values; and providing , by the mobile communication terminal, connection information via NFC to an input window of an application of a digital image-capturing apparatus selected from the digital image-capturing apparatus selection list, wherein the connection information is used for the application of the selected digital image-capturing apparatus to perform a communication connection between an external device and the selected digital image-capturing apparatus, and wherein the external device comprises at least one of an access point (AP) or a server.

7. The method of claim 6, further comprising:

displaying, by the mobile communication terminal, a connection information selection list corresponding to the selected digital image-capturing apparatus; and providing , by the mobile communication terminal, connection information selected from the connection information selection list via NFC to the selected digital image-capturing apparatus.

8. The method of claim 6, wherein the external device comprises a server that comprises at least one of a social network service (SNS) server or a cloud service server, and the connection information comprises at least one of an ID, an e-mail, or a password for connection with the server.

9. A digital image-capturing apparatus comprising:

a connection information receiving unit that receives connection information from a mobile communication terminal that provides the connection information to the digital image-capturing apparatus via near field communication (NFC);

a connection information input unit that inputs the connection information to an input window of an application of the digital image-capturing apparatus for performing a communication connection between the digital image-capturing apparatus and an external device; and a communication connection unit that performs the communication connection between the digital image-capturing apparatus and the external device, based on the connection information, wherein the external device comprises at least one of an access point (AP) or a server, and wherein the connection information is used in communication with the external device.

10. The digital image-capturing apparatus of claim 9, further comprising:

a first identification (ID) value obtaining unit that receives identification (ID) values of one or more mobile communication terminals from the one or more mobile communication terminals, wherein the one or more mobile communication terminals provide the ID values via NFC; and a memory that stores one or more pieces of the connection information that are divided based on the ID values obtained by the first ID value obtaining unit.

11. The digital image-capturing apparatus of claim 10, further comprising:

a mobile communication terminal selection list generating unit that generates a mobile communication terminal selection list, based on the ID values obtained by the first ID value obtaining unit;

a user input unit that allows selection of a mobile communication terminal from the mobile communication terminal selection list generated by the mobile communication terminal selection list generating unit; and a first display unit that displays connection information received via NFC from the selected mobile communication terminal.

12. The digital image-capturing apparatus of claim 11, wherein the connection information input unit:

displays the connection information received from the selected mobile communication terminal, wherein the connection information is enabled to be selected by a user; and inputs selected connection information to a connection information input window of the application of the digital image-capturing apparatus that corresponds to the selected connection information.

13. The digital image-capturing apparatus of claim 9, wherein the external device comprises a server that comprises at least one of a social network service (SNS) server or a cloud service server, and the connection information comprises at least one of an ID, an e-mail, or a password for connection with the server.

14. A computer-readable non-transitory recording medium having recorded thereon computer program codes for executing a method of receiving, by a digital image-capturing apparatus, connection information from a mobile communication terminal when the computer program codes are read and executed by a processor, the method comprising:

receiving by the digital image-capturing apparatus, the connection information from a mobile communication terminal that provides the connection information to the digital image-capturing apparatus via near field communication (NFC);

inputting, b the digital the connection information to an input window of an application of the digital image-capturing apparatus for performing a communication connection between the digital image-capturing apparatus and an external device; and performing the communication connection between the digital image-capturing apparatus and the external device, based on the connection information, wherein the external device comprises at least one of an access point (AP) or a server, and wherein the connection information is used in communication with the external device.

15. The computer-readable non-transitory recording medium of claim 14, wherein the method further comprises:

receiving, by the digital image-capturing apparatus, identification (ID) values of one or more mobile communication terminals via NFC from the one or more mobile communication terminals; and dividing and storing, by the digital image-capturing apparatus, one or more pieces of the connection information based on the ID values.

16. The computer-readable non-transitory recording medium of claim 15, wherein the method further comprises:

displaying, by the digital image-capturing apparatus, a mobile communication terminal selection list, based on the ID values; and displaying by the digital image-capturing apparatus connection information received from a selected mobile communication terminal that is selected from the mobile communication terminal selection list.

17. The computer-readable non-transitory recording medium of claim 16, wherein the inputting of the connection information comprises:

displaying, by the digital image-capturing apparatus, the connection information received from the selected mobile communication terminal, wherein the connection information is enabled to be selected;

displaying by the digital image-capturing apparatus a connection information input window of the application of the digital image-capturing apparatus, the application corresponding to selected connection information; and inputting, by the digital the selected connection information to the connection information input window of the application.

18. The computer-readable non-transitory recording medium of claim 14, wherein the external device comprises a server that comprises at least one of a social network service (SNS) server or a cloud service server, and the connection information comprises at least one of an ID, an e-mail, or a password for connection with the server.

19. A mobile communication terminal comprising:

an identification (ID) value obtaining unit that receives identification (ID) values of one or more digital image-capturing apparatuses from the one or more digital image-capturing apparatuses, wherein the one or more digital image-capturing apparatuses provide the ID values to the mobile communication terminal via near field communication (NFC);

a display unit that displays a digital image-capturing apparatus selection list, based on the ID values; and a connection information providing unit that provides connection information via NFC to an input window of an application of a selected digital image-capturing apparatus that is selected from the digital image-capturing apparatus selection list, wherein the connection information is used for the application of the selected digital image-capturing apparatus to perform a communication connection between an external device and the selected digital image-capturing apparatus, and wherein the external device comprises at least one of an access point (AP) or a server.

20. A computer-readable non-transitory recording medium having recorded thereon computer program codes for executing a method of providing connection information when the computer program codes are read and executed by a processor, the method performed by a mobile communication terminal and comprising:

receiving, by the mobile communication terminal, identification (ID) values of one or more digital image-capturing apparatuses from the one or more digital image-capturing apparatuses, wherein the one or more digital image-capturing apparatuses provide the ID values to the mobile communication terminal via near field communication (NFC);

displaying, by the mobile communication terminal, a digital image-capturing apparatus selection list, based on the ID values; and providing , by the mobile communication terminal, connection information via NFC to an input window of an application of a digital image-capturing apparatus selected from the digital image-capturing apparatus selection list, wherein the connection information is used for the application of the selected digital image-capturing apparatus to perform a communication connection between an external device and the selected digital image-capturing apparatus, and wherein the external device comprises at least one of an access point (AP) or a server.

* * * * *